(12) United States Patent
Moriya

(10) Patent No.: US 10,306,453 B2
(45) Date of Patent: May 28, 2019

(54) COMMUNICATION APPARATUS AND CONTROL METHOD FOR THE SAME

(71) Applicant: CANON KABUSHIKI KAISHA, Tokyo (JP)

(72) Inventor: Takashi Moriya, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/594,281

(22) Filed: May 12, 2017

(65) Prior Publication Data
US 2017/0339548 A1  Nov. 23, 2017

(30) Foreign Application Priority Data

May 20, 2016 (JP) ................... 2016-101791

(51) Int. Cl.
*H04W 8/00* (2009.01)
*H04W 48/16* (2009.01)
(Continued)

(52) U.S. Cl.
CPC ............ *H04W 8/005* (2013.01); *H04W 48/16* (2013.01); *H04W 76/14* (2018.02); *H04W 76/15* (2018.02);
(Continued)

(58) Field of Classification Search
CPC ....... H04W 8/00; H04W 8/005; H04W 48/16; H04W 76/02; H04W 76/023; H04W 76/025; H04W 76/14; H04W 76/15; H04W 84/12; H04W 88/06; H04W 88/10; H04W 76/00
See application file for complete search history.

(56) References Cited

U.S. PATENT DOCUMENTS 8,811,349 B2 *  8/2014  Deshpande ............ H04W 48/16
                                                    370/332
8,818,278 B2 *  8/2014  Levy .................... H04W 8/005
                                                    455/41.2
(Continued)

FOREIGN PATENT DOCUMENTS

EP        2257108 A1     12/2010
JP     2014-216956 A     11/2014

*Primary Examiner* — Tri H Phan
(74) *Attorney, Agent, or Firm* — Canon U.S.A., Inc., IP Division

(57) ABSTRACT

Issues are addressed by providing a control method including executing first search processing for searching for a second apparatus by using a predetermined communication channel used for a first wireless connection and second search processing for searching for the second apparatus by using the predetermined communication channel in a succession of the first search processing in a state in which the first wireless connection is established and executing third search processing for searching for the second apparatus by using a first communication channel other than the predetermined communication channel and fourth search processing for searching for the second apparatus by using a second communication channel other than the predetermined communication channel in a succession of the third search processing in a state in which the first wireless connection is established in a case where the second apparatus is not discovered by the first search processing and the second search processing.

15 Claims, 14 Drawing Sheets

(51) Int. Cl.
    *H04W 76/00*    (2018.01)
    *H04W 84/12*    (2009.01)
    *H04W 76/14*    (2018.01)
    *H04W 76/15*    (2018.01)
    *H04W 88/06*    (2009.01)
    *H04W 88/10*    (2009.01)

(52) U.S. Cl.
    CPC ............ *H04W 84/12* (2013.01); *H04W 88/06* (2013.01); *H04W 88/10* (2013.01)

(56) References Cited

U.S. PATENT DOCUMENTS

| | | | |
|---|---|---|---|
| 9,125,237 B2* | 9/2015 | Goto | H04L 43/12 |
| 9,699,817 B2* | 7/2017 | Ginnela | H04W 76/18 |
| 9,723,550 B2* | 8/2017 | Sato | H04W 36/0066 |
| 9,730,045 B2* | 8/2017 | Shimazaki | H04W 8/005 |
| 9,999,077 B2* | 6/2018 | Sumiuchi | H04W 76/34 |
| 10,037,093 B2* | 7/2018 | Yamamoto | G06F 3/041 |
| 2008/0026795 A1* | 1/2008 | Fujii | H04W 28/18 455/561 |
| 2011/0161697 A1 | 6/2011 | Qi | |
| 2012/0166671 A1 | 6/2012 | Qi | |
| 2013/0311666 A1 | 11/2013 | Fujii | |
| 2014/0320909 A1* | 10/2014 | Shimazaki | H04W 8/005 358/1.15 |
| 2014/0362841 A1 | 12/2014 | Shibata | |
| 2015/0334759 A1 | 11/2015 | Hiramatsu | |
| 2016/0157163 A1* | 6/2016 | Lee | H04W 48/08 370/338 |
| 2016/0165427 A1* | 6/2016 | Yasuda | H04W 8/005 370/254 |
| 2017/0347312 A1* | 11/2017 | Kang | H04W 88/10 |

* cited by examiner

COMMUNICATION APPARATUS AND CONTROL METHOD FOR THE SAME

BACKGROUND OF THE INVENTION

Field of the Invention

The present invention relates to a communication apparatus and a control method for the communication apparatus.

Description of the Related Art

A communication apparatus that can establish a connection with a communication partner apparatus via an external apparatus such as a wireless router (hereinafter, which will be referred to as an infrastructure connection) and a direct connection with a communication partner apparatus without the intermediation of an external apparatus (hereinafter, which will be referred to as a peer-to-peer (P2P) connection) concurrently (in parallel) has been proposed. It should be noted that an operation in which the two types of connections can be established concurrently (in parallel) in the above-described manner and communications via the two types of connections can be performed concurrently (in parallel) will be hereinafter referred to as a simultaneous operation.

Japanese Patent Laid-Open No. 2014-216956 describes an apparatus a technology in which, in a case where a connection with an access point (AP) in a state of the simultaneous operation is disconnected, the AP is searched for by using a channel used for a direct connection with a terminal apparatus.

In a case where the connection with the external apparatus in the simultaneous operation state is disconnected, and the external apparatus is searched for by using a channel other than the channel used for the P2P connection with the connection partner apparatus, for example, packet loss or the like may occur in the communication with the connection partner apparatus in the P2P connection state.

In these days, as described in Japanese Patent Laid-Open No. 2014-216956, with the spread of the communication apparatus that can perform the simultaneous operation, improvement in usability for a user is in more demand than ever in the technology for searching for the external apparatus in a case where the connection with the external apparatus is disconnected in the simultaneous operation state. In view of the above, the present invention provides a communication apparatus that can improve the usability for the user in the technology for searching for the external apparatus in a case where the connection with the external apparatus is disconnected in the simultaneous operation state, a control method for the communication apparatus, and a program.

SUMMARY OF THE INVENTION

To address the above-described issues, a control method according to an aspect of the present invention relates to a control method for a communication apparatus that can establish a first wireless connection based on a predetermined communication standard with a first apparatus and a second wireless connection based on the predetermined communication standard with a second apparatus concurrently, the control method including executing first search processing for searching for the second apparatus by using a predetermined communication channel used for the first wireless connection and second search processing for searching for the second apparatus by using the predetermined communication channel in a succession of the first search processing in a state in which the first wireless connection is established, executing third search processing for searching for the second apparatus by using a first communication channel other than the predetermined communication channel and fourth search processing for searching for the second apparatus by using a second communication channel other than the predetermined communication channel in a succession of the third search processing in a state in which the first wireless connection is established in a case where the second apparatus is not discovered by the first search processing and the second search processing, and establishing the second wireless connection in a case where the second apparatus that can be wirelessly connected to the communication apparatus is discovered by one of the first search processing, the second search processing, the third search processing, and the fourth search processing.

In addition, a control method according to another aspect of the present invention relates to a control method for a communication apparatus that can establish a first wireless connection based on a predetermined communication standard with a first apparatus and a second wireless connection based on the predetermined communication standard with a second apparatus concurrently, the control method including executing first search processing for searching for the second apparatus by using a first communication channel used for the first wireless connection and second search processing for searching for the second apparatus by using the first communication channel in a succession of the first search processing in a state in which the first wireless connection is established, executing third search processing for searching for the second apparatus by using a second communication channel other than the first communication channel and fourth search processing for searching for the second apparatus by using the second communication channel in a succession of the third search processing in a state in which the first wireless connection is established in a case where the second apparatus is not discovered by the first search processing and the second search processing, and establishing the second wireless connection in a case where the second apparatus that can be wirelessly connected to the communication apparatus is discovered by one of the first search processing, the second search processing, the third search processing, and the fourth search processing.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

Hereinafter, with reference to the drawings, exemplary embodiments of the present invention will be described for illustrative purposes. It should be noted however that relative arrangements, display screens, and the like described in the present exemplary embodiment are not intended to limit the scope of this invention to those unless particularly specified.

First Exemplary Embodiment

A terminal apparatus and a communication apparatus according to the present exemplary embodiment will be described. A smart phone is exemplified as the terminal apparatus according to the present exemplary embodiment. The smart phone refers to a multi-functional mobile phone provided with camera, web browser, and electronic mail functions and the like in addition to a mobile phone function. It should be noted that the terminal apparatus to which the exemplary embodiment of the present invention can be applied is not limited to the smart phone, and any apparatus that can communicate with a communication apparatus which will be described below may be used. For example, a digital camera, a mobile terminal, a laptop personal computer (PC), a tablet terminal, a personal digital assistant (PDA), a music playing device, and the like can be used as the terminal apparatus. In addition, according to the present exemplary embodiment, a multi function printer provided with a copying function, a facsimile (FAX) function, and a printing function (hereinafter, which will be referred to as an MFP) is exemplified as the communication apparatus but the configuration is not limited to this. Various apparatuses can be used as long as the apparatus can perform a communication with the terminal apparatus. For example, an ink-jet printer, a full-color laser beam printer, a monochrome printer, and the like can be used as a printer. In addition, the configuration is not limited to the printer, and a copier, a facsimile apparatus, a smart phone, a mobile terminal, a laptop PC, a tablet terminal, a PDA, a digital camera, a music playing device, a storage, and the like can also be used. In addition to the above, a single function printer provided with a sole function (hereinafter, which will be referred to as an SFP) can also be used.

System Configuration

First, a system configuration for realizing the present exemplary embodiment will be described with reference to FIGS. 1 to 6.

Figure 1:
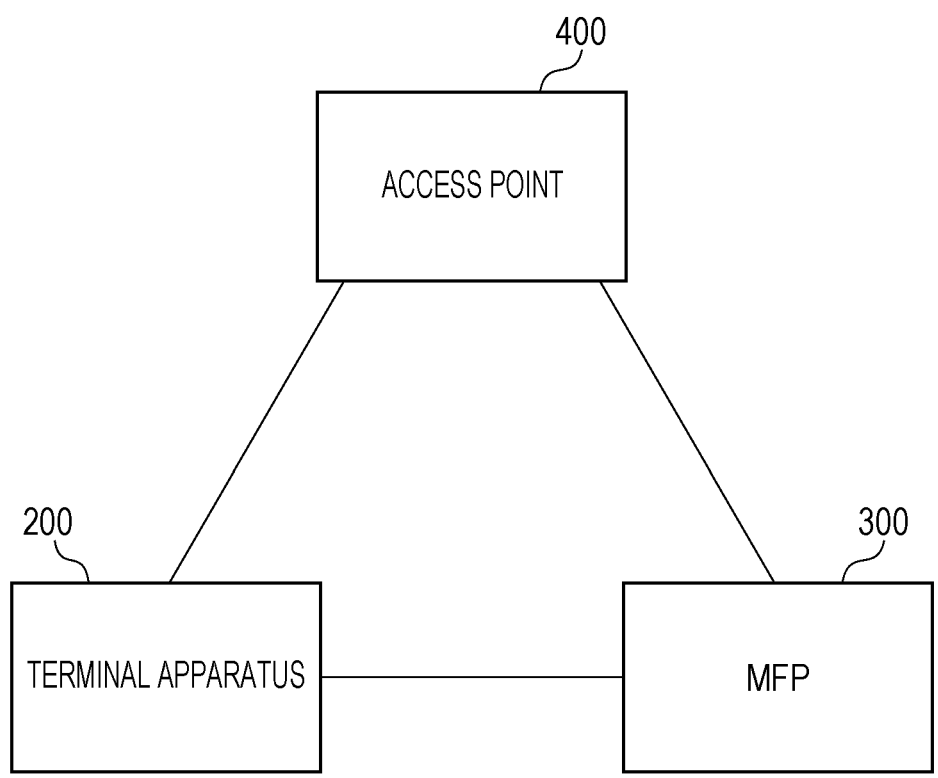
FIG. 1 illustrates an example of a configuration of a communication system.

FIG. 1 illustrates an example of a configuration of a communication system according to the present exemplary embodiment. This system includes an access point 400, a terminal apparatus 200, and an MFP 300.

The terminal apparatus 200 is a terminal apparatus according to the present exemplary embodiment. The MFP 300 is a communication apparatus according to the present exemplary embodiment. The terminal apparatus 200 and the MFP 300 can establish a wireless local area network (WLAN) via the access point 400 provided outside the respective apparatuses and communicate with each other. In addition, with regard to the MFP 300 and the terminal apparatus 200, each of the apparatuses itself can also operate as the access point. For this reason, for example, when one of the apparatuses functions as the access point, and the other apparatus is connected to this access point, the terminal apparatus 200 and the MFP 300 can establish a direct wireless LAN connection without the intermediation of the access point 400. In addition, since both the terminal apparatus 200 and the MFP 300 have a WLAN function, it is possible to perform a peer-to-peer (hereinafter, which will be referred to as P2P) communication when authentication processing is executed. It should be noted that, in a case where each of the apparatuses functions as the access point, the apparatus constructs a wireless LAN with a communication partner apparatus and periodically transmits a beacon signal. Furthermore, in a case where each of the apparatuses functions as the access point, the apparatus determines a channel used for the wireless communication and performs authentication processing for connection information (such as a password) transmitted from the communication partner apparatus.

A wireless communication system constituted by an access point and a client will be described. First, an apparatus functioning as the access point transmits the beacon signal. When the client receives the beacon signal, the client transmits a device search command (probe request frame) to the access point to search for and discover an apparatus corresponding to a communication partner (connection partner apparatus). An apparatus to be searched for (client) can attach various attributes (parameters) to the device search command. In particular, in the case of a P2P wireless connection, the device search command includes information (P2P element) related to the P2P wireless connection. When the access point refers to the received device search command and transmits a response command (probe response frame), the apparatuses can mutually discover the apparatus on the partner side (apparatus search (discovery)). Then, a sequence for checking device information indicating a type of the apparatus or an IP address or the like is executed, and thereafter, it is possible to execute various applications such as printing.

Figure 2:
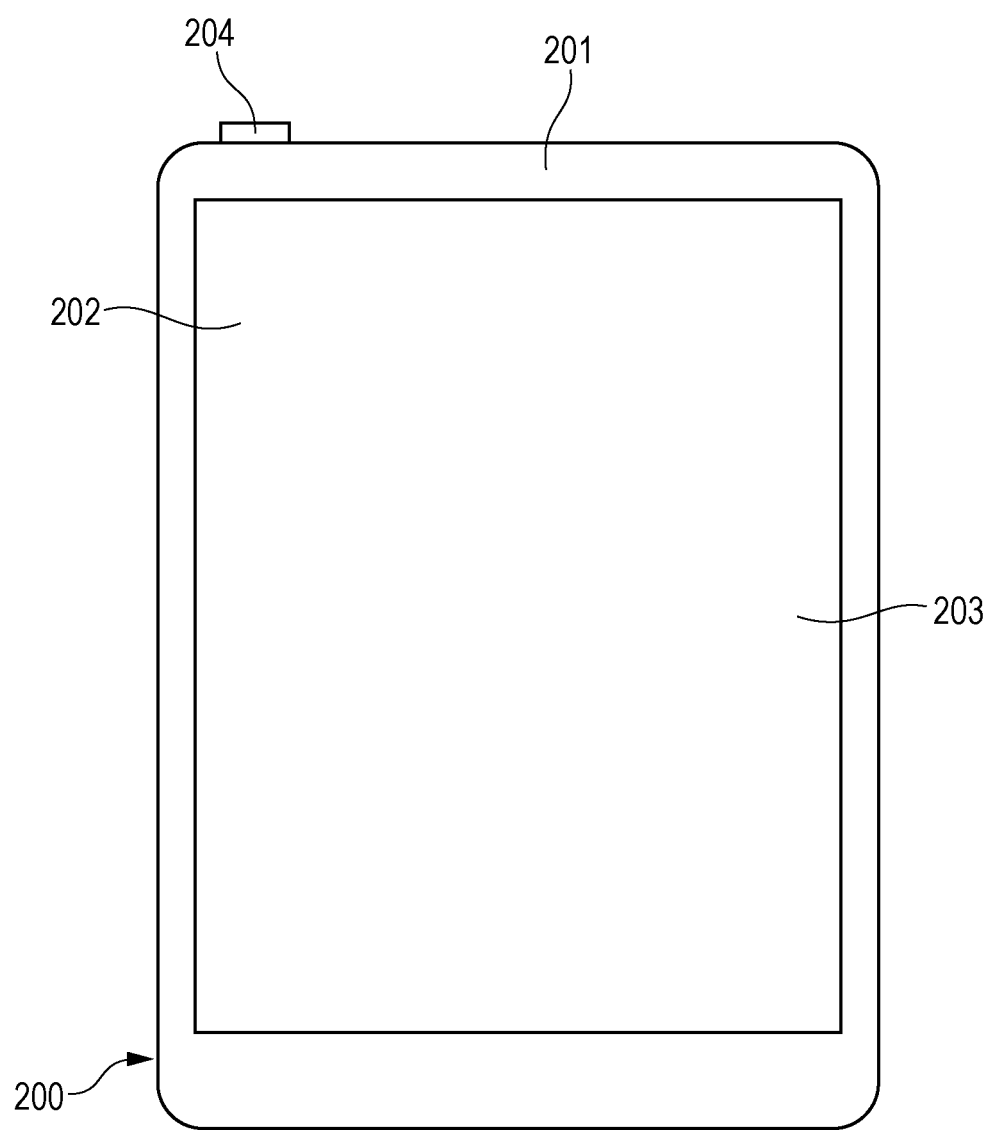
FIG. 2 illustrates an example of an external appearance of a terminal apparatus.

FIG. 2 illustrates an external appearance of the terminal apparatus 200.

A WLAN unit 201 is a unit configured to perform a wireless communication by way of WLAN. The WLAN unit 201 can perform a data (packet) communication in a WLAN system in conformity to IEEE802.11 series, for example. That is, the WLAN unit 201 can execute a communication by way of Wi-Fi (registered trademark), for example. The WLAN unit 201 realizes functions such as beacon detection processing, authentication processing, transmission of a print job to the communication apparatus that has established the WLAN connection, and the like. In addition, the WLAN unit 201 can perform a communication in a Wi-Fi Direct (registered trademark) (hereinafter, which will be referred to as WFD) mode, a software AP mode, an ad-hoc mode, an infrastructure mode, and the like. The communication in the WFD mode, the communication in the software AP mode, and the communication in the ad-hoc mode refer to a direct communication with the connection partner apparatus (the MFP 300 or the like) (without the intermediation of an external apparatus). In addition, the communication in the infrastructure mode refers to a communication with the connection partner apparatus via an external apparatus (the access point 400 or the like) provided on a network.

A display unit 202 is a display provided with a display mechanism of an LCD method, for example. Specifically, the display unit 202 displays a button icon or a software keyboard.

An operation unit 203 is provided with an operation mechanism of a touch panel method and detects an operation by a user. Specifically, the operation unit 203 detects an operation event generated when the user touches the button icon or the software keyboard displayed by the display unit 202.

A power key 204 is a hard key used when a power supply is turned on and off.

Figure 3:
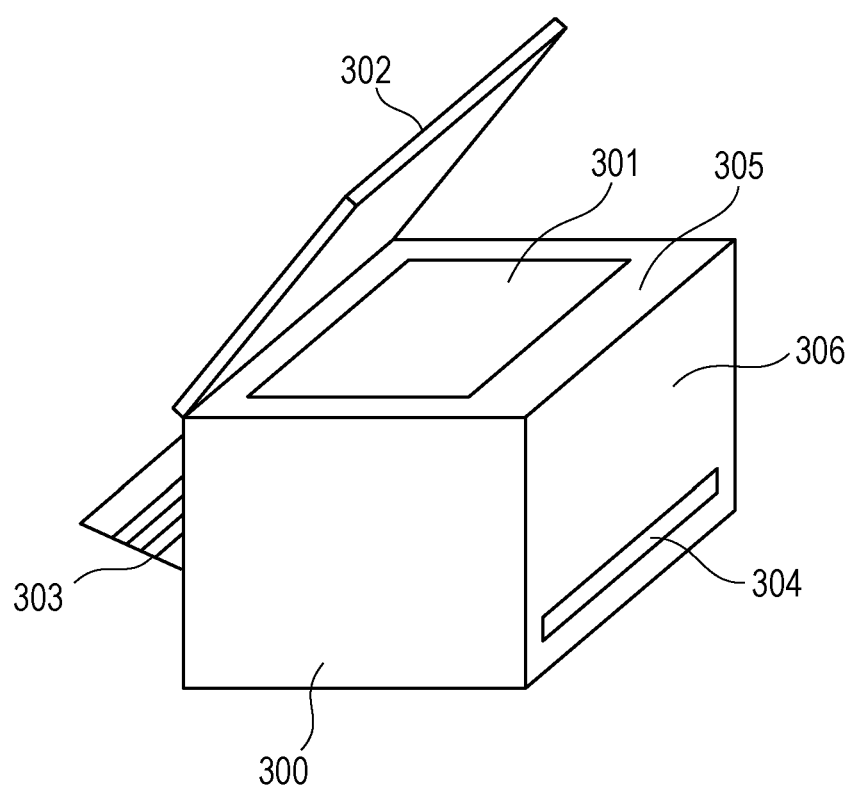
FIG. 3 illustrates an example of an external appearance of an MFP.

FIG. 3 illustrates an external appearance of the MFP 300. A platen glass 301 is a transparent platen made of glass on which a document is placed to be read by a scanner (reading unit). A document lid 302 is a lid for pressing the document when reading is performed by the scanner or avoiding leakage to the outside of reading light with which the document is irradiated when the reading is performed.

A print sheet insertion slot 303 is an insertion slot in which sheets of various sizes can be set. The sheets set in the print sheet insertion slot 303 are conveyed one by one to a printing unit which is not illustrated in the drawing and discharged from a print sheet discharge slot 304 after printing is performed by the printing unit.

An operation display unit 305 is constituted by keys such as a character input key, a cursor key, a determination key, and a cancel key, a light emitting diode (LED), a liquid crystal display (LCD), and the like and can accept activations of various functions as the MFP and various settings from the user. It should be noted that the operation display unit 305 may be constituted by a touch panel.

A WLAN antenna 306 is an antenna for performing a communication by way of WLAN.

Figure 4A:
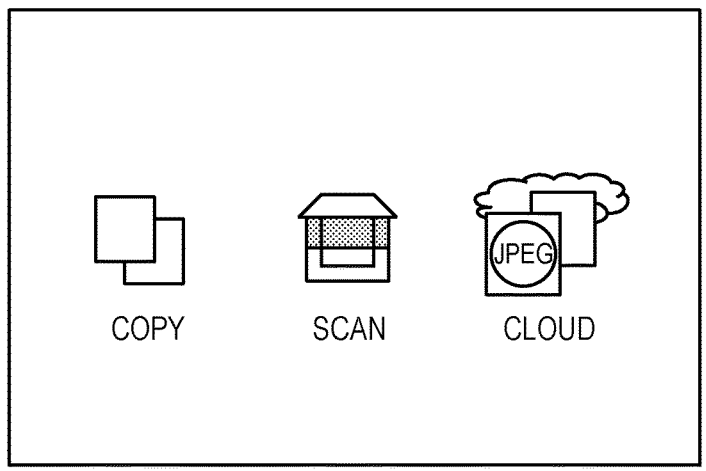
FIGS. 4A to 4C illustrate examples of a screen displayed on an operation display unit of the MFP.
Figure 4B:
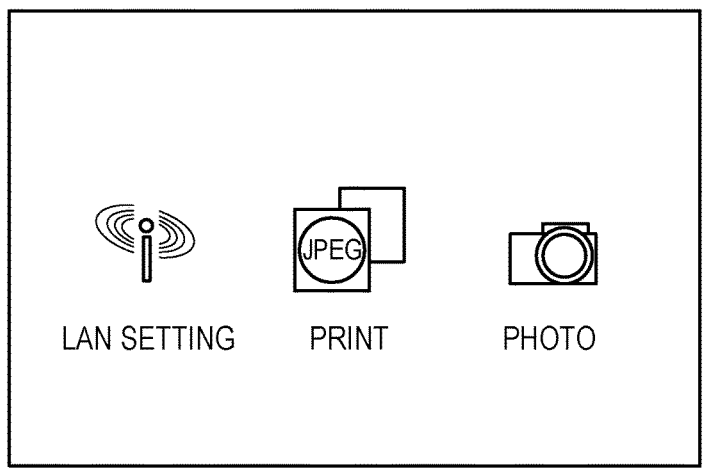
Figure 4C:
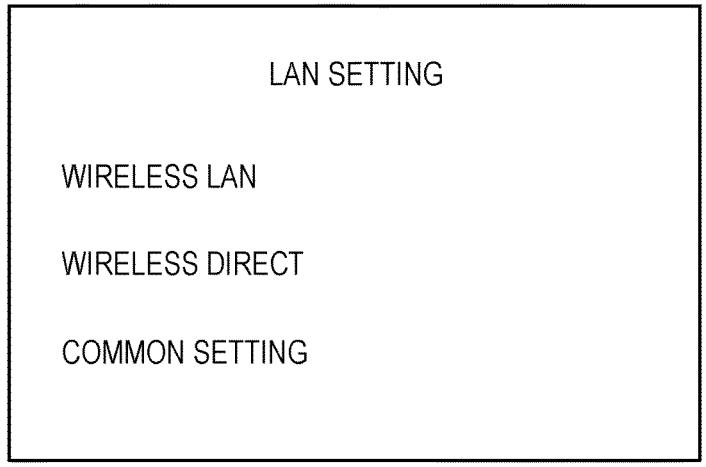

FIGS. 4A to 4C illustrate examples of a screen displayed on the operation display unit 305. FIG. 4A illustrates a screen displayed on the operation display unit 305 in a state in which the MFP 300 does not perform an operation such as printing or scanning (idle state). The MFP 300 can execute copying, scanning, menu display of a cloud function using an internet communication, and various settings and functions in a state in which the screen is displayed on the operation display unit 305. When the above-described operation is accepted, the operation display unit 305 can seamlessly display a screen different from that of FIG. 4A. FIG. 4B illustrates an example thereof. When the key operation or the touch panel operation by the user is accepted in a state in which the screen illustrated in FIG. 4B is displayed on the operation display unit 305, the MFP 300 can execute a printing or photographing function or change of the LAN setting. FIG. 4C illustrates a screen displayed when the user performs the operation for executing the LAN setting in a state in which the screen of FIG. 4B is displayed on the operation display unit 305. In a case where "wireless LAN" on the screen illustrated in FIG. 4C is selected by the user operation, the MFP 300 performs validation/invalidation setting of the infrastructure mode. On the other hand, in a case where "wireless direct" on the screen illustrated in FIG. 4C is selected by the user operation, the MFP 300 performs validation/invalidation setting of a WFD mode.

Figure 5:
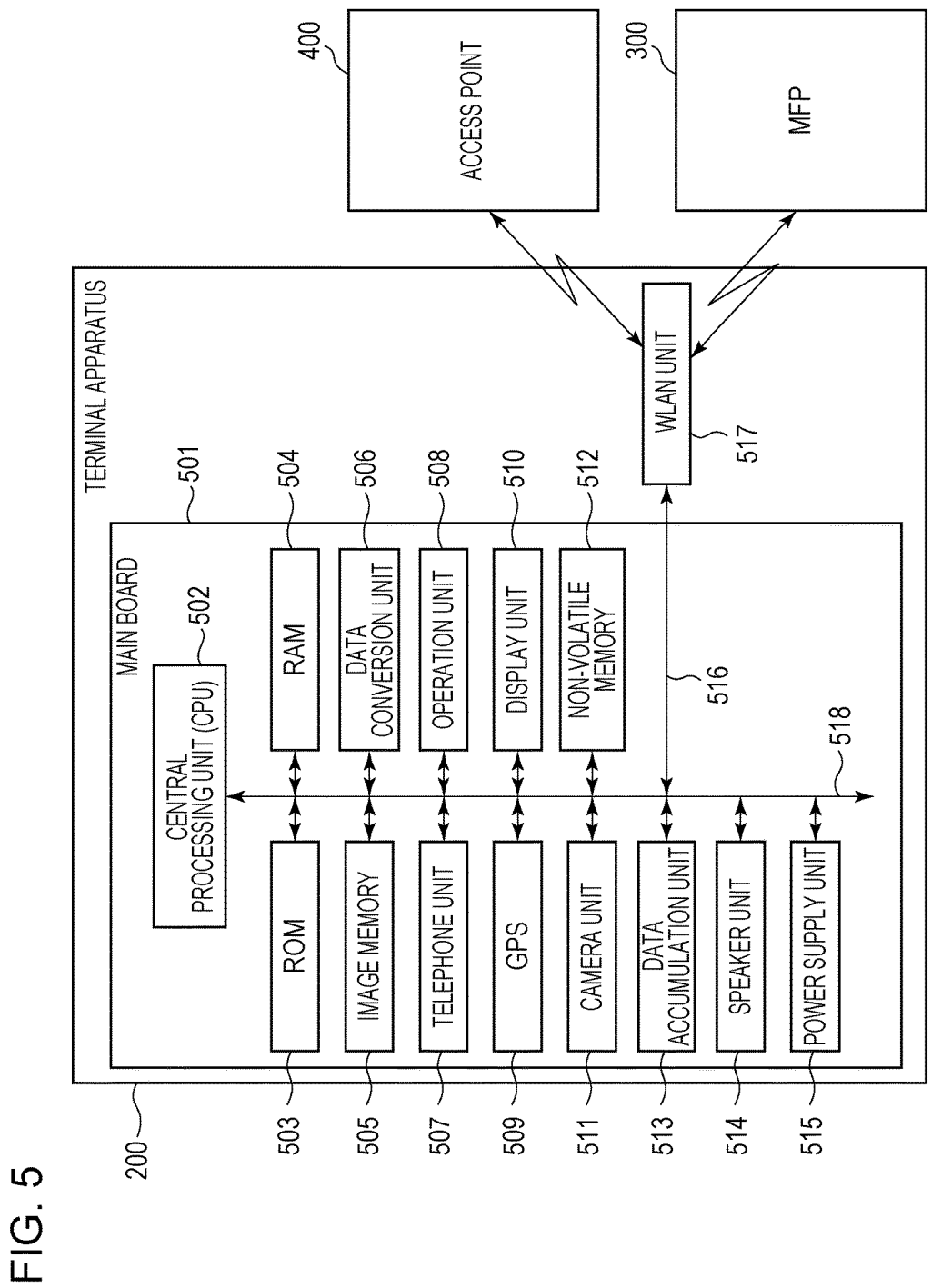
FIG. 5 is a block diagram illustrating a configuration of the terminal apparatus.

FIG. 5 is a block diagram illustrating a configuration of the terminal apparatus 200.

The terminal apparatus 200 includes a main board 501 configured to perform main control of the apparatus itself and a WLAN unit 517 configured to perform a WLAN communication.

A central processing unit (CPU) 502 functions as a system control unit and controls the entirety of the terminal apparatus 200 by execution of a program stored in a ROM 503 or activation of hardware on the main board 501. It should be noted that processing executed by the terminal apparatus 200 which will be described below is executed under the control of the CPU 502.

The ROM 503 stores control programs executed by the CPU 502, a built-in operating system (OS) program, and the like. According to the present exemplary embodiment, the control programs stored in the ROM 503 perform software control such as scheduling and task switching under the management of the built-in OS stored in the ROM 503.

A RAM 504 is a memory constituted by a static random access memory (SRAM), a dynamic random access memory (DRAM), or the like. The RAM 504 stores data such as program control variables and data such as setting values registered by the user and management data of the terminal apparatus 200. It should be noted that various work buffer areas are provided in the RAM 504.

An image memory 505 is constituted by a memory such as a DRAM and temporarily stores image data received via the WLAN unit 517 and image data read out from a data accumulation unit 513 to be processed by the CPU 502.

A non-volatile memory 512 is constituted by a memory such as a flash memory and stores data that should be held even when the power supply is turned off.

It should be noted that a memory configuration held by the terminal apparatus 200 is not limited to this mode, and the number of memories, characteristics, storage capacities, and the like may be appropriately changed in accordance with the use and purpose. For example, the image memory 505 and the RAM 504 may be commonly used, or data backup or the like may be performed in the data accumulation unit 513. In addition, according to the present exemplary embodiment, the DRAM is used as the image memory 505, but another storage medium such as a hard disc drive (HDD) or a non-volatile memory may also be used, for example.

A data conversion unit 506 performs analysis of data in various formats, color conversion with respect to the image data, and data conversion such as image conversion.

A telephone unit 507 performs telephone line control and realizes a communication by way of telephone by processing audio data input and output via a speaker unit 514.

An operation unit 508 controls a signal output from the operation unit 203 and detects an operation by the user.

A global positioning system (GPS) 509 obtains position information of current latitude and longitude of the terminal apparatus 200.

A display unit 510 electronically controls contents of the screen displayed on the display unit 202 and can perform display of various input operation screens, operation situation screen of the MFP 300, status situation screen, and the like on the display unit 202.

A camera unit 511 has a function of electronically recording an image input via a lens to be coded. Image data corresponding to the image shot by the camera unit 511 is saved in the data accumulation unit 513.

The speaker unit 514 realizes a function of inputting or outputting audio for the telephone function and also a function of alarm notification and the like.

A power supply unit 515 is a portable battery and controls power supply into the terminal apparatus 200. Power supply states of the terminal apparatus 200 include a battery exhaustion state in which the battery has no remaining power, a power off state in which the power key 204 is not pressed, an activation state in which the terminal apparatus 200 is normally activated, and a power saving state in which the terminal apparatus 200 is activated but power consumption is lower than that of the activation state.

The WLAN unit 517 is a unit configured to perform a wireless communication by way of WLAN and corresponds to the WLAN unit 201 described above. It is assumed that the WLAN unit 517 can perform a data (packet) communication in the WLAN system in conformity to the IEEE802.11 series, for example. That is, the WLAN unit 517 can execute a communication by way of Wi-Fi (registered trademark), for example. The WLAN unit 517 performs functions including beacon detection processing and authentication processing to establish a WLAN connection, transmission of a printing job to a communication apparatus where the WLAN connection is established, and the like. The terminal apparatus 200 performs a data communication with another device such as the MFP 300 by the WLAN unit 517. The WLAN unit 517 converts the data into packets and performs packet transmission to the other device, or inversely, restores the packets from the other external device to the original data to be transmitted to the CPU 502. It should be noted that the WLAN unit 517 is connected to the main board 501 via a bus cable 516.

The various components (503 to 515 and 517) in the main board 501 are connected to one another via a system bus 519 managed by the CPU 502.

Figure 6:
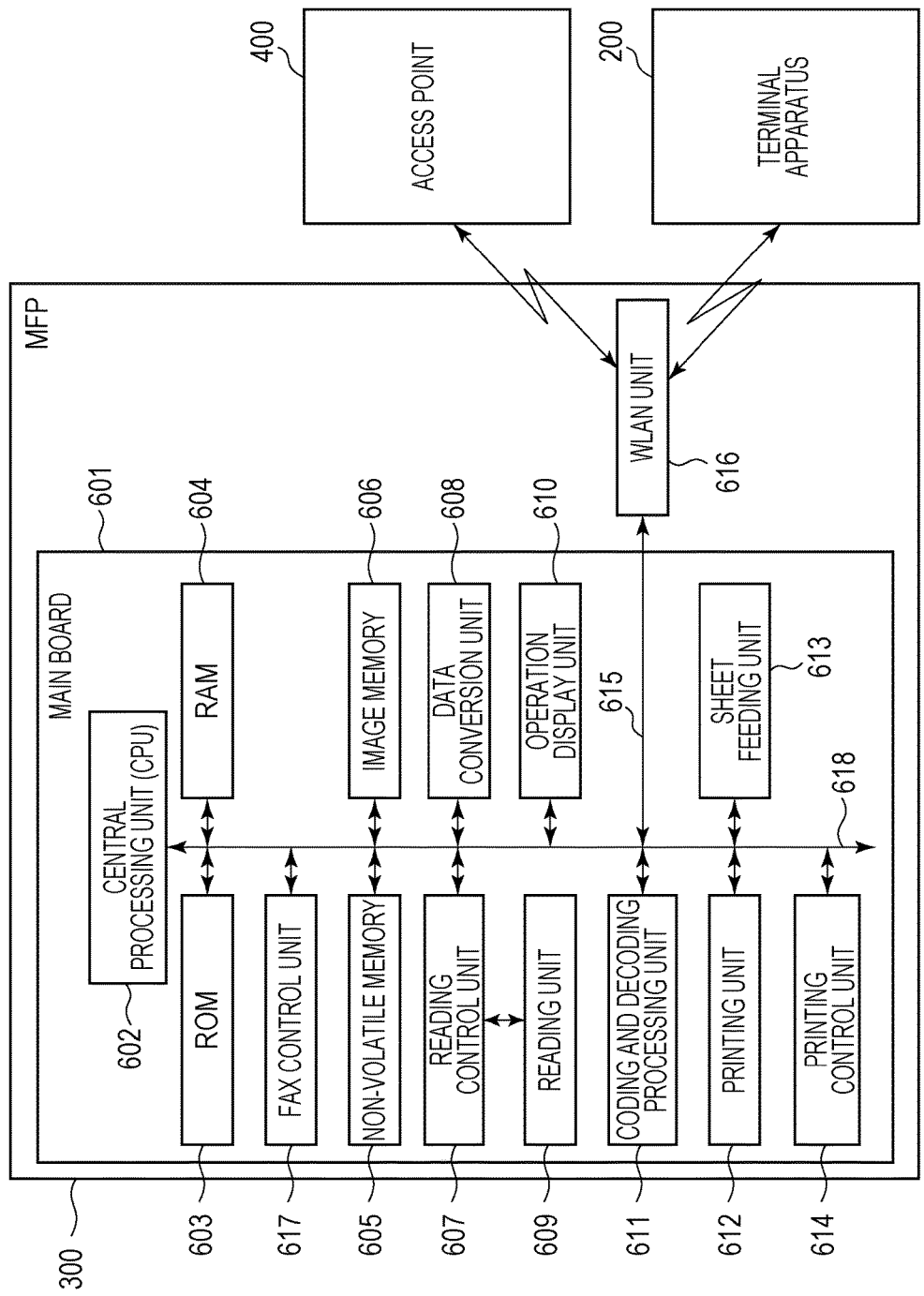
FIG. 6 is a block diagram illustrating a configuration of the MFP.

FIG. 6 is a block diagram illustrating a configuration of the MFP 300.

The MFP 300 includes a main board 601 configured to perform main control of the apparatus itself and a WLAN unit 616 configured to perform a WLAN communication.

A CPU 602 functions as a system control unit and controls the entirety of the MFP 300 by execution of a program stored in a ROM 603 or activation of hardware on the main board 601. It should be noted that processing executed by the MFP 300 which will be described below is executed under the control by the CPU 602.

The ROM 603 stores control programs executed by the CPU 602, a built-in OS program, and the like. According to the present exemplary embodiment, the respective control programs stored in the ROM 603 perform software control such as scheduling and task switching under the management of the built-in OS stored in the ROM 603.

A RAM 604 is a memory constituted by an SRAM, a DRAM, or the like. The RAM 604 stores data including data of program control variables and the like, setting values registered by the user, and data of management data of the MFP 300 and the like. It should be noted that various work buffer areas are provided in the RAM 604.

A non-volatile memory 605 is constituted by a memory such as a flash memory and stores data that should be held even when the power supply is turned off.

An image memory 606 is constituted by a memory such as a DRAM and accumulates image data received via the WLAN unit, image data processed by a coding and decoding processing unit 611, and the like.

In addition, similarly as in the memory configuration held by the terminal apparatus 200, the memory configuration held by the MFP 300 is not limited to this mode, and the number of memories, characteristics, storage capacities, and the like may be appropriately changed in accordance with the use and purpose.

A data conversion unit 608 performs analysis of data in various formats, conversion from image data to print data, and the like.

A reading control unit 607 controls a reading unit 609 (for example, a contact image sensor (CIS)) to optically read an image on the document. Then, the reading control unit 607 outputs an image signal obtained by converting the read image into electric image data. At this time, the reading control unit 607 may apply various image processings such as binarization processing and half tone processing to the image signal and then output the image signal.

An operation display unit 610 corresponds to the operation display unit 305 and accepts activations of various functions as the MFP and various settings from the user.

The coding and decoding processing unit 611 performs coding and decoding processing or enlargement and reduction processing with respect to the image data (JPEG, PNG, or the like) dealt with by the MFP 300.

A sheet feeding unit 613 holds recoding media for printing. It should be noted that a plurality of sheet feeding units 613 may be prepared to hold plural types of recording media in a single apparatus.

A printing control unit 614 controls the sheet feeding unit 613 and can supply the recording media to a printing unit 612. It should be noted that, in a case where the plurality of sheet feeding units 613 are prepared, the printing control unit 614 can control from which sheet feeding unit the sheet feeding is performed among the plurality of sheet feeding units 613.

The printing control unit 614 applies various image processings such as smoothing processing, print density correction processing, and color correction to the image data to be printed and then outputs the image data to the printing unit 612.

The printing unit 612 is an ink-jet printer configured to eject ink supplied from an ink tank from a print head to print an image. It should be noted that the printing unit 612 may be a printer other than the ink-jet printer. For example, a laser beam printer or the like may also be used. The printing control unit 614 periodically reads out information of the printing unit 612 to update the information of the RAM 604. Specifically, the printing control unit 614 updates status information such as the remaining amount of the ink tank and a state of the print head. Since the WLAN unit 616 corresponds to the WLAN unit 201, descriptions thereof will be omitted. The WLAN unit 616 is connected to the main board 601 via a bus cable 615. It should be noted that the terminal apparatus 200 and the MFP 300 can perform a communication based on Wi-Fi Direct (WFD) by the WLAN units provided in the respective apparatuses and have a software access point (software AP) function. The software AP function refers to a function for causing the apparatus that executes this function to operate as the software-based access point.

Since the WLAN unit 616 has a function similar to that of the WLAN unit included in the terminal apparatus 200, descriptions thereof will be omitted. It should be noted that, in a case where the WLAN unit 616 performs the communication in the WFD mode, the communication in the software AP mode, or the communication in the ad-hoc mode, the WLAN unit 616 directly communicates with the connection partner apparatus such as the terminal apparatus 200 (without the intermediation of the external apparatus). In a case where the WLAN unit 616 performs the communication in the infrastructure mode, the WLAN unit 616 communicates with the connection partner apparatus via the external apparatus (the access point 400 or the like) installed on the network.

The various components (602 to 614 and 616) in the main board 601 are connected to one another via a system bus 618 managed by the CPU 602.

Regarding Communication Mode Based on the Peer-to-peer (P2P) Method

To establish a connection of the P2P method in the communication in the WLAN, the MFP 300 according to the present exemplary embodiment operates in the P2P mode (the software AP mode or the Wi-Fi Direct (WFD) mode). It should be noted that, according to the present exemplary embodiment, the connection based on the P2P method refers to a mode in which the apparatuses are directly wirelessly connected to each other without the intermediation of the external apparatus.

It should be noted that WFD is the standard established by Wi-Fi Alliance. The terminal apparatus 200 and the MFP 300 functioning as WFD compatible devices have the software access point (software AP) function for operating as the access point. For this reason, the terminal apparatus 200 and the MFP 300 can be directly wirelessly connected to each other by way of WFD without the intermediation of the other access point. It should be noted that which one of the plurality of WFD compatible devices operates as the software AP is determined in accordance with a sequence called a group owner negotiation. Hereinafter, an apparatus functioning as the WFD compatible device and also playing the role as the access point is particularly referred to as a group owner.

It should be noted that, in a communication system constituted by apparatuses that communicate in respective modes, the apparatus on the searching side uses the device search command (for example, the probe request frame) to search for and discover the apparatus corresponding to the communication partner (connection partner apparatus). The apparatus to be searched for can attach various attributes (parameters) to the device search command. In particular, at the time of the search for the connection based on the P2P method, the device search command includes information (P2P element) related to the P2P wireless connection. In a case where an attribute is specified in the search command, it is normally recommended that the apparatus responding to the device search command responds to the interpretable attribute to a maximum extent within a range stipulated by a specification of the mode of the apparatus on the searching side and the prerequisite specification (Wi-Fi in the case of WFD). Even in a case where the apparatus responding to the device search command does not interpret the information attached to the device search command (including the above-described attribute), the apparatus can also respond on the basis of only the information that can be interpreted.

Hereinafter, wireless connection sequences in the respective modes will be described with reference to FIG. 7 and FIG. 8.

Figure 7:
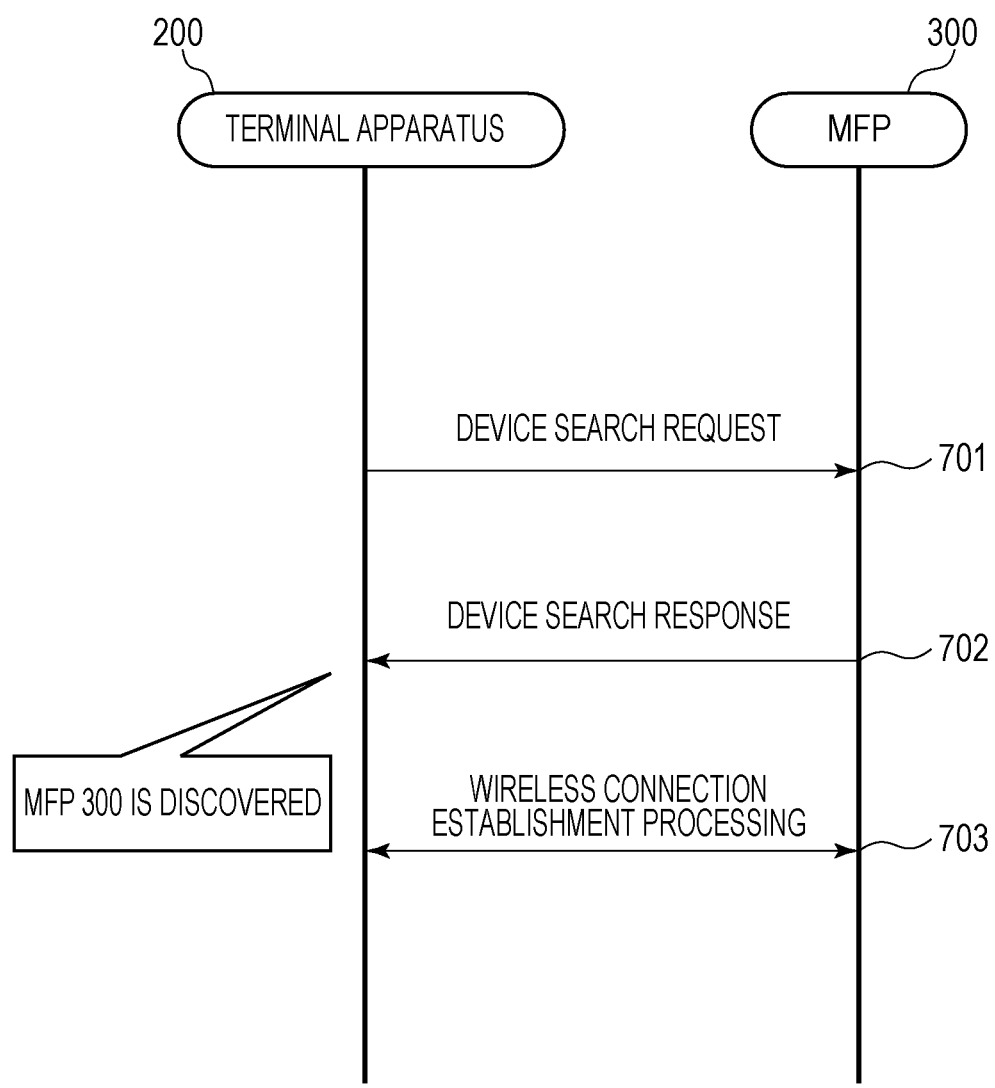
FIG. 7 illustrates a wireless connection sequence in a software AP mode.

FIG. 7 illustrates a wireless connection sequence in the software AP mode. It should be noted that the processings executed by the respective apparatuses in the present sequence are realized when the CPUs included in the respective apparatuses read out the various programs stored in the memories such as the ROMs included in the respective apparatuses to the RAMs included in the respective apparatuses to be executed. In addition, the present sequence is started in a state in which the terminal apparatus 200 operates as the client, the MFP 300 operates as the software AP, and the MFP 300 transmits the beacon signal. It should be noted that the MFP 300 starts the operation as the software AP in a case where the MFP 300 accepts a predetermined operation for operating as the software AP from the user. In addition, the predetermined operation refers to an operation for selecting a predetermined icon for starting the operation as the software AP on a LAN setting screen, for example.

First, in S701, the terminal apparatus 200 sequentially uses channels that can be utilized by the terminal apparatus 200 to transmit the device search command and searches for an apparatus that operates as the software AP.

Next, in S702, in a case where the device search command transmitted from the terminal apparatus 200 is received, the MFP 300 transmits a device search response corresponding to a response with respect to the device search command to the terminal apparatus 200. It should be noted that the MFP 300 does not transmit the device search response with respect to the device search command transmitted by using a channel other than the channel used by itself. For example, when a channel that can be used by the MFP 300 is Channel 4, the MFP 300 does not transmit a response command to a device search request command transmitted by using Channel 1. For this reason, in a case where the response from the MFP 300 is not present for a predetermined period of time or longer after the device search command is transmitted by using Channel 1, the terminal apparatus 200 transmits the device search request command by using Channel 2. The terminal apparatus 200 repeats the above-described attempt by incrementing the number of the used channel. When the device search command transmitted by the terminal apparatus 200 by using Channel 4 is received, for example, the MFP 300 transmits the device search response to the terminal apparatus 200. As a result, the terminal apparatus 200 discovers the MFP 300. It should be noted that the channel used for the transmission of the device search response is determined as the channel used for the communication between the terminal apparatus 200 and the MFP 300 hereinafter. That is, the channel used for the communication between the terminal apparatus 200 and the MFP 300 is determined by the MFP 300 operating as the software AP.

Next, in S703, establishment processing for a wireless connection in related art is executed between the terminal apparatus 200 and the MFP 300. Specifically, processings such as transmission of a connection request, authentication of the connection request, and allocation of an IP address are performed. It should be noted that, with regard to commands and parameters transmitted and received in the establishment processing for the wireless connection between the terminal apparatus 200 and the MFP 300, commands and parameters stipulated by the Wi-Fi standard specifications may be used, and descriptions thereof will be omitted here.

Figure 8:
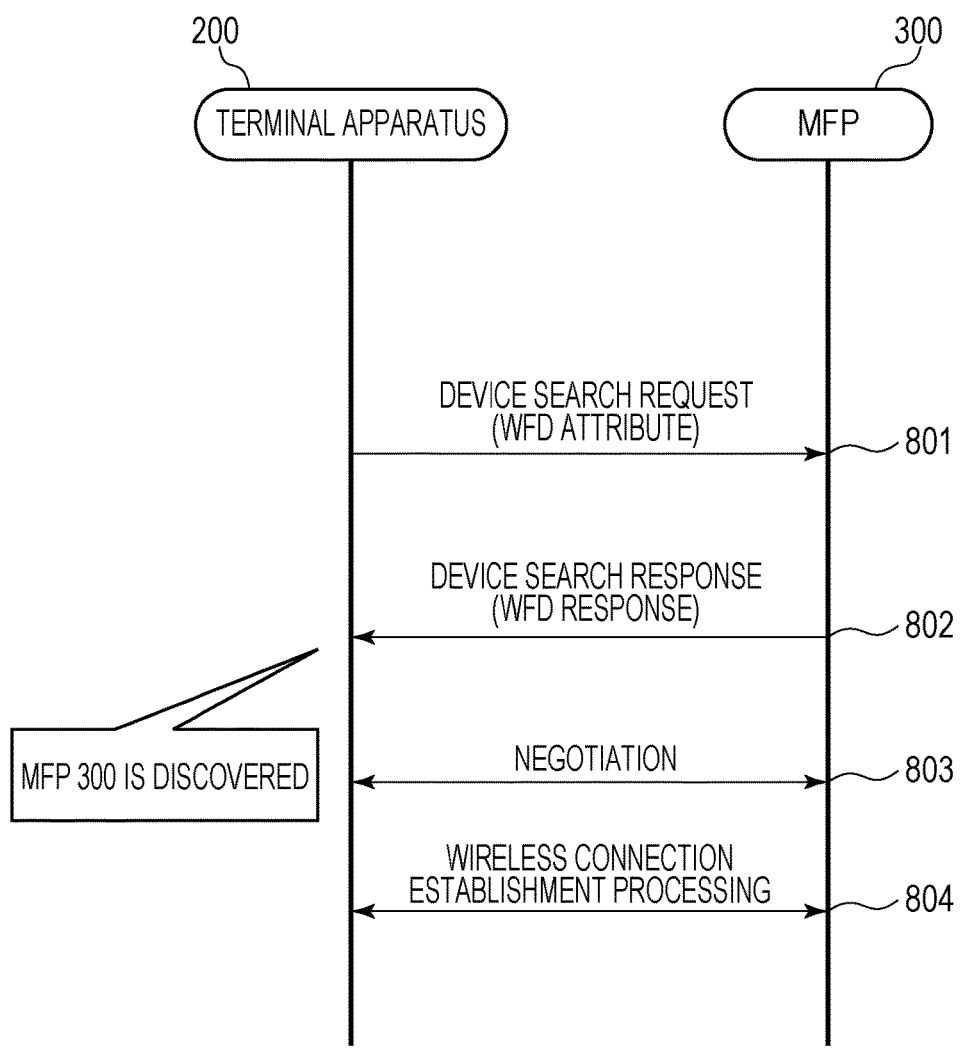
FIG. 8 illustrates the wireless connection sequence in a WFD mode.

FIG. 8 illustrates a wireless connection sequence in the WFD mode. It should be noted that the processings executed by the respective apparatuses in the present sequence are realized when the CPUs included in the respective apparatuses read out the various programs stored in the memories such as the ROMs included in the respective apparatuses to the RAMs included in the respective apparatuses to be executed. In addition, the present processing is started in a case where the predetermined operation for establishing the connection based on WFD is accepted from the user in a state in which the respective apparatuses activate the predetermined application for executing the WFD function.

First, in S801, the terminal apparatus 200 transmits the device search command to search for the apparatus corresponding to the WFD function as the communication partner apparatus.

Next, in S802, the MFP 300 transmits the device search response corresponding to the response with respect to the received device search command to the terminal apparatus 200. As a result, the terminal apparatus 200 discovers the MFP 300 as the apparatus corresponding to the WFD function. It should be noted that, after the terminal apparatus 200 discovers the MFP 300, processing for exchanging information related to services and functions that can be supplied by the respective apparatuses may be performed between the respective apparatuses.

Next, in S803, negotiation processing is performed between the terminal apparatus 200 and the MFP 300. The negotiation processing refers to processing for determining the roles in the communication based on the P2P method (the group owner and the client) by using predetermined setting values held by the respective apparatuses. It should be noted that, in a case where the roles of the respective apparatuses are determined by the negotiation processing, parameters for performing the communication by way of Wi-Fi Direct are exchanged between the respective apparatuses (parameter exchange phase). The parameter exchange phase corresponds, for example, to automatic exchange of parameters for wireless LAN security by Wi-Fi Protected Setup. It should be noted that, after the negotiation is performed, the group owner determines the channel used for the subsequent communication.

Thereafter, in S804, the respective apparatuses execute the wireless connection establishment processing on the basis of the exchanged parameters.

It should be noted that a configuration may also be adopted in which the MFP 300 can accept a setting on whether or not the negotiation is executed in the wireless connection sequence in the WFD mode from the user. In a case where it is set that the negotiation is not executed, the MFP 300 itself operates as the group owner.

Regarding Infrastructure Mode

As described above, the infrastructure mode refers to the mode in which the apparatuses that perform the communication (for example, the terminal apparatus 200 and the MFP 300) communicate with each other via the external apparatus that controls the network in an overall manner (for example, the access point 400).

Figure 9:
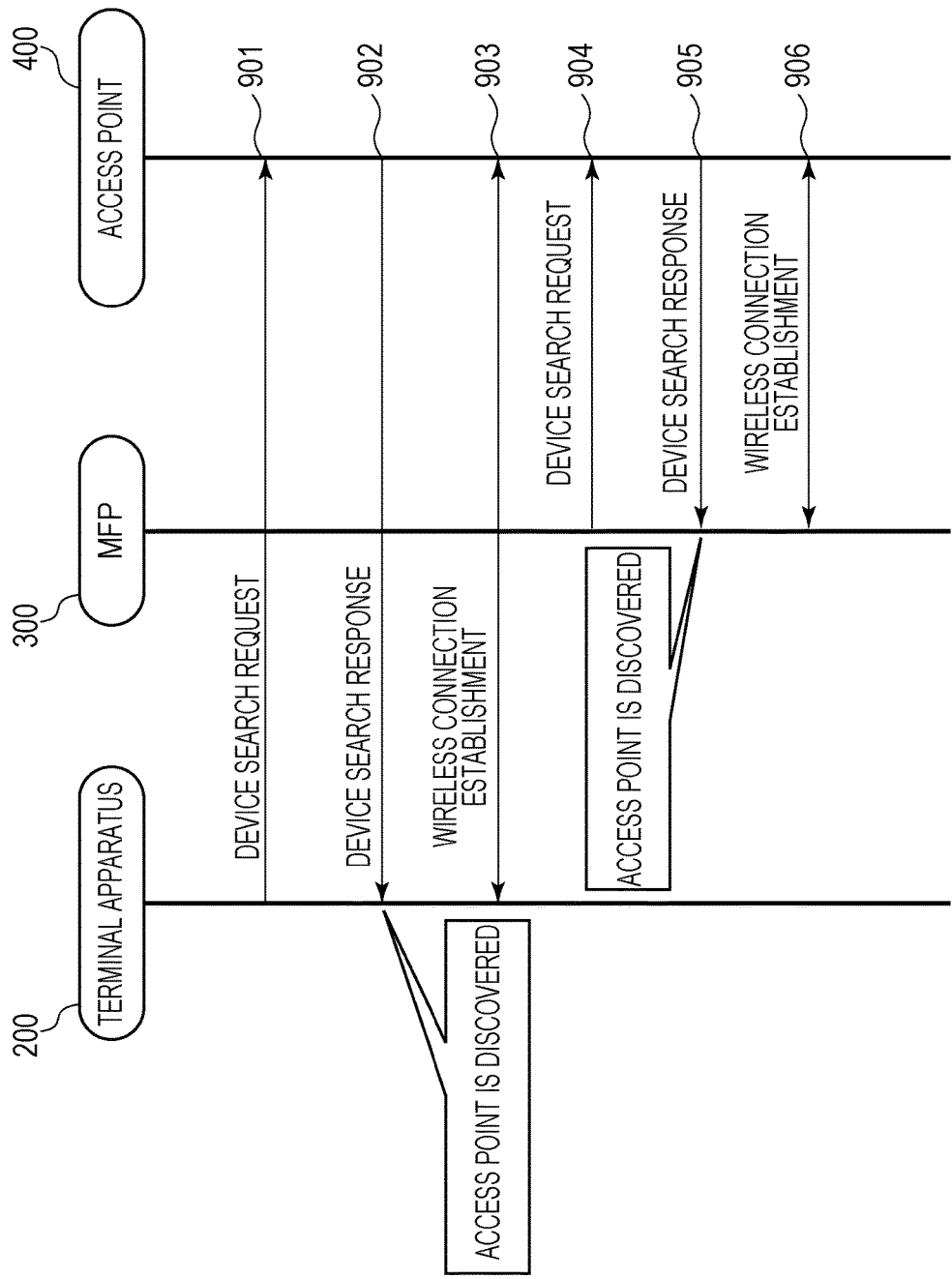
FIG. 9 illustrates the wireless connection sequence in an infrastructure mode.

FIG. 9 illustrates a wireless connection sequence in the infrastructure mode. It should be noted that the processings executed by the respective apparatuses in the present sequence are realized when the CPUs included in the respective apparatuses read out the various programs stored in the memories such as the ROMs included in the respective apparatuses to the RAMs included in the respective apparatuses to be executed.

First, in S901, the terminal apparatus 200 sequentially uses channels that can be utilized by the terminal apparatus 200 to transmit the device search command and searches for an apparatus that operates as the software AP.

Next, in S902, in a case where the device search command transmitted from the terminal apparatus 200 is received, the access point 400 transmits the device search response command corresponding to the response with respect to the device search command to the terminal apparatus 200. It should be noted that, as described in the explanation of S702, the access point 400 transmits the device search response command only with respect to the device search command transmitted in the channel used by the access point 400 itself. As a result, the terminal apparatus 200 discovers the access point 400. It should be noted that the channel used for the transmission of the device search response command is determined as the channel used for the communication between the terminal apparatus 200 and the access point 400 hereinafter. That is, the channel used for the communication in the infrastructure mode is determined by the access point 400.

Next, in S903, the establishment processing for the wireless connection in the related art is executed between the terminal apparatus 200 and the access point 400. Specifically, the processings such as the transmission of the connection request, the authentication of the connection request, and the allocation of the IP address are performed. It should be noted that, similarly as in the P2P mode, with regard to the commands and the parameters transmitted and received in the establishment processing for the wireless connection between the terminal apparatus 200 and the MFP 300, the commands and the parameters stipulated by the Wi-Fi standard may be used, and descriptions thereof will be omitted here.

In S904 to S906, processing similar to S901 to S903 is executed between the MFP 300 and the access point 400. It should be noted that, at this time, the access point 400 transmits the device search response command to the MFP 300 by using the channel used for the communication with the terminal apparatus 200. That is, the access point 400 performs the communication with the MFP 300 and the terminal apparatus 200 by using the same channel.

As a result, the MFP 300 and the terminal apparatus 200 are connected to each other via the access point 400, so that it is possible to perform the communication between the MFP 300 and the terminal apparatus 200 via the access point 400.

Regarding Simultaneous Operation

The MFP 300 according to the present exemplary embodiment can execute the communication in the infrastructure mode and the communication in the P2P mode concurrently (in parallel). For this reason, the MFP 300 can maintain the connection for the communication in the infrastructure mode and the connection for the communication in the P2P mode concurrently (in parallel). Hereinafter, the connection for the communication in the infrastructure mode (connection with the terminal apparatus 200 via the access point 400) will be referred to as an infrastructure connection. In addition, the connection for the communication in the P2P mode (connection with the terminal apparatus 200 without the intermediation of the access point 400) will be referred to as a P2P connection. The P2P connection is a connection in the wireless network in which the MFP 300 or the terminal apparatus 200 also functions as the AP. The infrastructure connection is a connection in the wireless network constituted by the access point 400. In addition, an operation in which the infrastructure connection and the P2P connection can be established concurrently (in parallel) and communications via the infrastructure connection and the P2P connection can be performed concurrently (in parallel) will be hereinafter referred to as a simultaneous operation.

Channel Determination Sequence in the Simultaneous Operation

The communication in the infrastructure mode and the communication in the P2P mode are performed by using a particular frequency band (particular channel). For this reason, in either the communication in the infrastructure mode or the communication in the P2P mode, before the communication is started, first, a channel used for the communication and connection between the respective apparatuses is to be determined. It should be noted that, in a mode in which a communication is performed by allocating a plurality of channels to a single wireless IC chip concurrently, the configuration of the respective apparatuses that perform the communication and the processings executed by the respective apparatuses become complex. Therefore, for example, in a case where the MFP 300 performs the simultaneous operation, a common channel is preferably used for the communications in the respective modes. That is, the MFP 300 preferably uses only one channel even in a case where the simultaneous operation is performed. For this reason, according to the present exemplary embodiment, the WLAN unit 616 has only one wireless IC chip configured to realize a communication by using a predetermined channel, and the MFP 300 does not perform the communication by using a plurality of channels concurrently.

As described above, when the MFP 300 operates as the group owner or the software AP, the MFP 300 can freely determine the channel used for the P2P connection. However, the channel used for the infrastructure connection is determined by the access point 400. For this reason, in a case where the simultaneous operation is performed, the MFP 300 preferably determines the channel used for the infrastructure connection which is determined by the access point as the channel used for the P2P connection.

It should be noted that, according to the present exemplary embodiment, Channels 1 to 13 in a frequency band of 2.4 GHz stipulated by the Wi-Fi standard are utilized in both the infrastructure connection and the P2P connection. However, the number of channels is increased in a different frequency band, or channels are limited to Channels 1 to 11 even in the same frequency band due to a regulation depending on a country or an area. For this reason, channels used by the MFP 300 are not limited to Channels 1 to 13. In addition, for example, according to IEEE 802.11a standard, Channels 36 to 140 in a frequency band of 5 GHz can be utilized. Moreover, in a case where the MFP 300 uses the frequency band of 2.4 GHz (Channels 1 to 13) and the frequency band of 5 GHz (Channels 36 to 140), the number of usable channels is increased as compared with a mode in which only one of the frequency bands is used. For this reason, in a case where both the frequency bands are used, the number of channels where the device search command is to be transmitted to the access point is increased. It should be noted that, in a case where the frequency band of 2.4 GHz (Channels 1 to 13) and the frequency band of 5 GHz (Channels 36 to 140) are used, the MFP 300 may start an AP search by using channels corresponding to one of the frequency bands (for example, 5 GHz) by priority.

Regarding Reconnection Processing

For example, the wireless connection between the MFP 300 and the access point 400 may be disconnected in some cases because of a disconnection factor including a case where a radio wave condition is deteriorated, a setting of the channel used for the infrastructure connection is changed by a user operation with respect to the access point 400, and the like. In this case, the MFP 300 attempts reconnection with the access point 400. Here, processing executed by the MFP 300 to reconnect with the access point 400 (reconnection processing) will be described.

Figure 10:
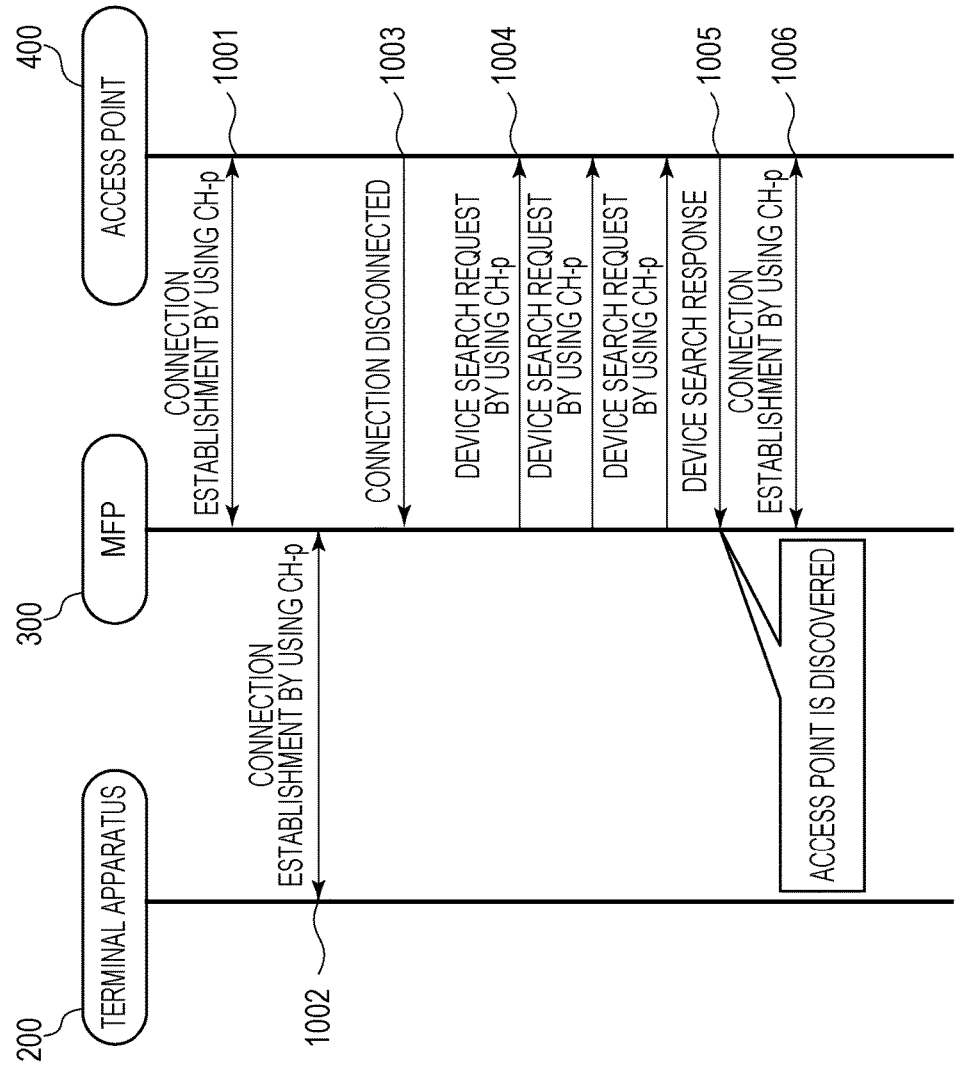
FIG. 10 illustrates a reconnection processing sequence in a case where a connection between the MFP and an access point is disconnected when the MFP is in a simultaneous operation.

FIG. 10 illustrates a sequence of the reconnection processing in a case where the connection between the MFP 300 and the access point 400 is disconnected in a state in which the MFP 300 performs the simultaneous operation. It should be noted that the processings executed by the respective apparatuses in the present sequence are realized when the CPUs included in the respective apparatuses read out the various programs stored in the memories such as the ROMs included in the respective apparatuses to the RAMs included in the respective apparatuses to be executed. In addition, the processing illustrated by the present sequence is started in a state in which the MFP 300 operates as the software AP.

First, in S1001, similarly as in the processing described in the explanation of FIG. 9, the MFP 300 and the access point 400 establish the wireless connection, and the MFP 300 and the connection partner apparatus establish the infrastructure connection via the access point 400. It should be noted that, herein, the channel used for the connection between the MFP 300 and the access point 400 (infrastructure connection) is determined as Channel p.

In S1002, similarly as in the processing described in the explanation of FIG. 8, the MFP 300 and the terminal apparatus 200 establish the P2P connection. It should be noted that, since the channel used for the connection between the MFP 300 and the access point 400 is Channel p, the channel used for the connection (P2P connection) between the MFP 300 and the terminal apparatus 200 is also determined as Channel p.

Next, in S1003, the connection between the MFP 300 and the access point 400 (infrastructure connection) is disconnected because of the above-described disconnection factor or the like. That is, in a state in which the MFP 300 establishes the infrastructure connection with the connection partner apparatus via the access point 400 and the P2P connection with the terminal apparatus 200 concurrently, the connection between the MFP 300 and the access point 400 is disconnected. At this time, specifically, the access point 400 transmits a disconnection command to the MFP 300. It should be noted that, in FIG. 10, even when the connection between the MFP 300 and the access point 400 is disconnected in S1003, the P2P connection between the terminal apparatus 200 and the MFP 300 is maintained.

It should be noted that, when the radio wave condition is deteriorated, the MFP 300 may be disconnected in a case other than a case where a disconnection packet is transmitted from the access point 400 to the MFP 300. Periodic beacons are transmitted from the access point 400, and the MFP 300 detects the beacons. For example, in a case where the beacons are transmitted at intervals of 100 milliseconds from the access point 400, when the radio wave condition is deteriorated, the MFP 300 may be put into a state in which the beacon reception is lost on the second time scale. The MFP 300 previously set a time-out period of the beacon reception. In a case where time-out occurs, beacon loss is determined, and the MFP 300 puts itself into a disconnected state. The time-out period for the beacon loss is preferably set as approximately 5 to 15 seconds. In this case, in S1003, the disconnection packet is not transmitted from the access point 400, but the connection between the MFP 300 and the access point 400 are put into the disconnected state.

Next, in S1004, to discover the access point 400 again to establish the connection, the MFP 300 performs the search for the access point 400 by using Channel p that is used for the disconnected infrastructure connection and also currently used for the P2P connection. That is, the MFP 300 transmits the device search request command to the access point 400 by using Channel p. It should be noted that, at this time, the MFP 300 may execute the transmission of the device search request command plural times. Hereinafter, the search for the access point 400 will be referred to as an AP search (access point search processing). It should be noted that in, a reason why the device search request is first performed by using Channel p in S1004 is that only a common channel is preferably continuously used in a plurality of communication modes during the simultaneous operation even in the case of the communication for the AP search as described above.

Next, in S1005, the access point 400 that has received the device search request command transmits the device search response command corresponding to the response with respect to the device search request command to the MFP 300. Thereafter, the connection processing in the related art is executed in S1006, so that the connection between the MFP 300 and the access point 400 is resumed.

As a result, even when the connection between the MFP 300 and the access point 400 is disconnected once, the MFP 300 can establish the infrastructure connection again by using Channel p.

However, for example, after the disconnection of the connection, in a case where the access point 400 autonomously refers to a congestion situation of a surrounding radio wave environment to shift the used channel to a relatively free channel, for example, the channel used by the access point 400 is changed from the disconnection of the connection. In addition, the change itself of the channel used for the connection by the access point 400 may be a factor for the disconnection of the connection in some cases.

Figure 11:
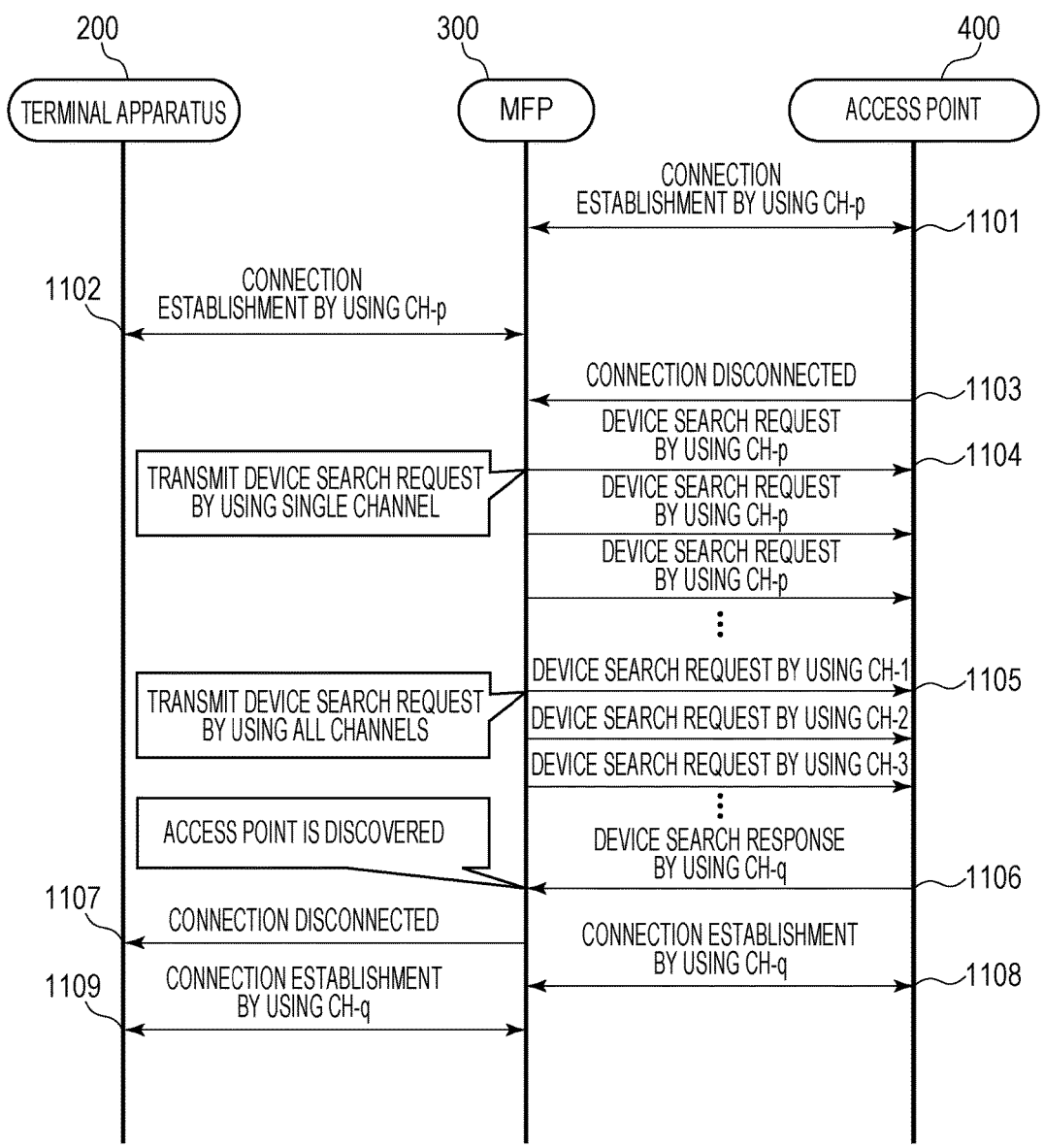
FIG. 11 illustrates the reconnection processing sequence including processing for searching for the access point by using a channel other than a channel used for a disconnected infrastructure connection.

In a case where the channel used by the access point 400 is changed, the access point 400 responds to only the device search request command transmitted by using the channel after the change. For this reason, the MFP 300 is not connected to the access point 400 again in the AP search based on the channel used for the disconnected infrastructure connection (that is, Channel p). In view of the above, in a case where the reconnection is not executed as a result of the execution of the AP search based on the channel used for the disconnected infrastructure connection, the MFP 300 according to the present exemplary embodiment executes the AP search by using a channel other than the channel used for the disconnected infrastructure connection. FIG. 11 illustrates the sequence of the reconnection processing including the processing for the MFP 300 to search for the access point 400 by using a channel other than the channel used for the disconnected infrastructure connection. It should be noted that the processings executed by the respective apparatuses in the present sequence are realized when the CPUs included in the respective apparatuses read out the various programs stored in the memories such as the ROMs included in the respective apparatuses to the RAMs included in the respective apparatuses to be executed. In addition, the processing illustrated by the present sequence is started in a state in which the MFP 300 operates as the software AP.

Since the processing in S1101 to S1104 is similar to the processing in S1001 to S1004, descriptions thereof will be omitted. It should be noted that, in S1103, after the connection between the MFP 300 and the access point 400 is disconnected, the channel used by the access point 400 is changed from Channel p to Channel q.

Since the channel used by the access point 400 is changed as described above, the MFP 300 does not detect the access point 400 in the AP search by using Channel p in S1104. For this reason, in a case where the AP search by using Channel p is repeated a predetermined times without detecting the access point 400, in S1105, the MFP 300 performs the AP search by using a channel other than Channel p. Specifically, the MFP 300 sequentially uses all the usable channels from Channel 1 to perform the AP searches. It should be noted that the MFP 300 may execute the transmission of the device search request command plural times in the AP searches by using the respective channels. It should be noted that, at this time, a configuration may be adopted in which the device search request is not transmitted by using all the channels that can be used by the MFP 300. That is, immediately before the connection between the MFP 300 and the access point 400 is disconnected from each other, the device search request may be transmitted by using a channel other than the channel used for the communication between the MFP 300 and the access point 400.

Since the channel used by the access point 400 is Channel q, in a case where the MFP 300 performs the AP search by using Channel q, in S1106, the access point 400 transmits the device search response command to the MFP 300.

Thereafter, in S1107, the MFP 300 disconnects the P2P connection with the terminal apparatus 200 once to switch the channel used for the P2P connection. It should be noted that a timing when the P2P connection with the terminal apparatus 200 is disconnected is not limited to a timing after S1106. For example, the timing may be a timing when the processing of the data communicated in the P2P mode is completed after the connection between the MFP 300 and the access point 400 is disconnected or the like.

Thereafter, the connection processing in the related art is executed in S1108 and S1109, and the connection between the MFP 300 and the access point 400 (infrastructure connection) and the connection (P2P connection) between the MFP 300 and the terminal apparatus 200 are resumed.

It should be noted that, with regard to the commands and the parameters transmitted and received in a case where the wireless connection between the apparatuses is resumed, the commands and the parameters stipulated by the Wi-Fi standard may be used, and descriptions thereof will be omitted here.

In the above-described mode, when the channel used by the access point 400 is not changed after the connection between the MFP 300 and the access point 400 is disconnected, the MFP 300 is reconnected to the access point 400 by the AP search in S1104. In this case, the MFP 300 omits the processing in S1105.

As a result, after the connection between the MFP 300 and the access point 400 is disconnected, even in a case where the channel used by the access point 400 is changed due to any factor, the MFP 300 can be reconnected to the access point 400.

It should be noted that, as described above, the MFP 300 according to the present exemplary embodiment performs the control in a manner that a plurality of channels are not used concurrently (in parallel). For this reason, in a case where the MFP 300 discovers a channel AP other than the channel used for the infrastructure connection (channel currently used for the P2P connection), a common channel is used in the respective communication modes, and the communication in the P2P mode is stopped once. However, in a case where a common channel can be set in the plurality of communication modes without stopping the communication in the P2P mode once depending on a performance of a WLAN module, a configuration may be adopted in which the communication in the P2P mode is not stopped.

It should be noted that, even in a state in which the communication in the P2P mode is not stopped, while the AP search is executed by using a channel other than the channel used for the P2P connection, there is a fear that packet loss or delay of the transmission packet may occur in the communication in the P2P mode. The packet loss refers to a state in which the packet transmitted by the terminal apparatus 200 by using the channel used for the P2P connection is not received by the MFP 300 to be lost since the channel other than the channel used for the P2P connection is used by the MFP 300. In addition, the delay of the transmission packet refers to a state in which the packet transmission to the terminal apparatus 200 is not performed since the MFP 300 uses the channel other than the channel used for the P2P connection, and the packet transmission is delayed until the channel used for the P2P connection can be used.

When the communication in the P2P mode is a network communication via TCP layer, even if the packet loss occurs, the lost packet is transmitted again. However, when the communication in the P2P mode is a network communication via UDP layer, the lost packet is not transmitted again. For this reason, when the packet loss occurs depending on a behavior of the OS, driver, or application of the terminal apparatus 200, there is a fear that the connection partner apparatus in the communication in the P2P mode is not detected, or the application is unusable.

The above-described issue hardly occurs in the AP search that is not executed after the simultaneous operation. This is because, even if the AP search is executed by using the channel other than the channel used for the infrastructure connection when the MFP 300 does not execute the communication in the P2P mode, the packet loss or the delay of the transmission packet does not occur.

That is, the AP search that is executed after the simultaneous operation and also that is executed by using the channel other than the channel used for the P2P connection is needed to establish the infrastructure connection again, but to reduce the influence on the communication, the number of executions of the AP search is preferably reduced as many as possible.

In view of the above, according to the present exemplary embodiment, a mode for suppressing the AP search that is executed after the simultaneous operation and also that is executed by using the channel other than the channel used for the P2P connection will be described. Specifically, the MFP 300 sets a period in which the AP search is executed when the connection is disconnected in a state in which the simultaneous operation is not performed to be shorter than a period in which the AP search is executed (repeated) when the connection is disconnected in a state in which the simultaneous operation is performed. In addition, the MFP 300 sets a period in which the AP search is executed by using the channel other than the channel currently used for the P2P connection to be longer than a period in which the AP search is executed by using the channel currently used for the P2P connection.

Figure 12:
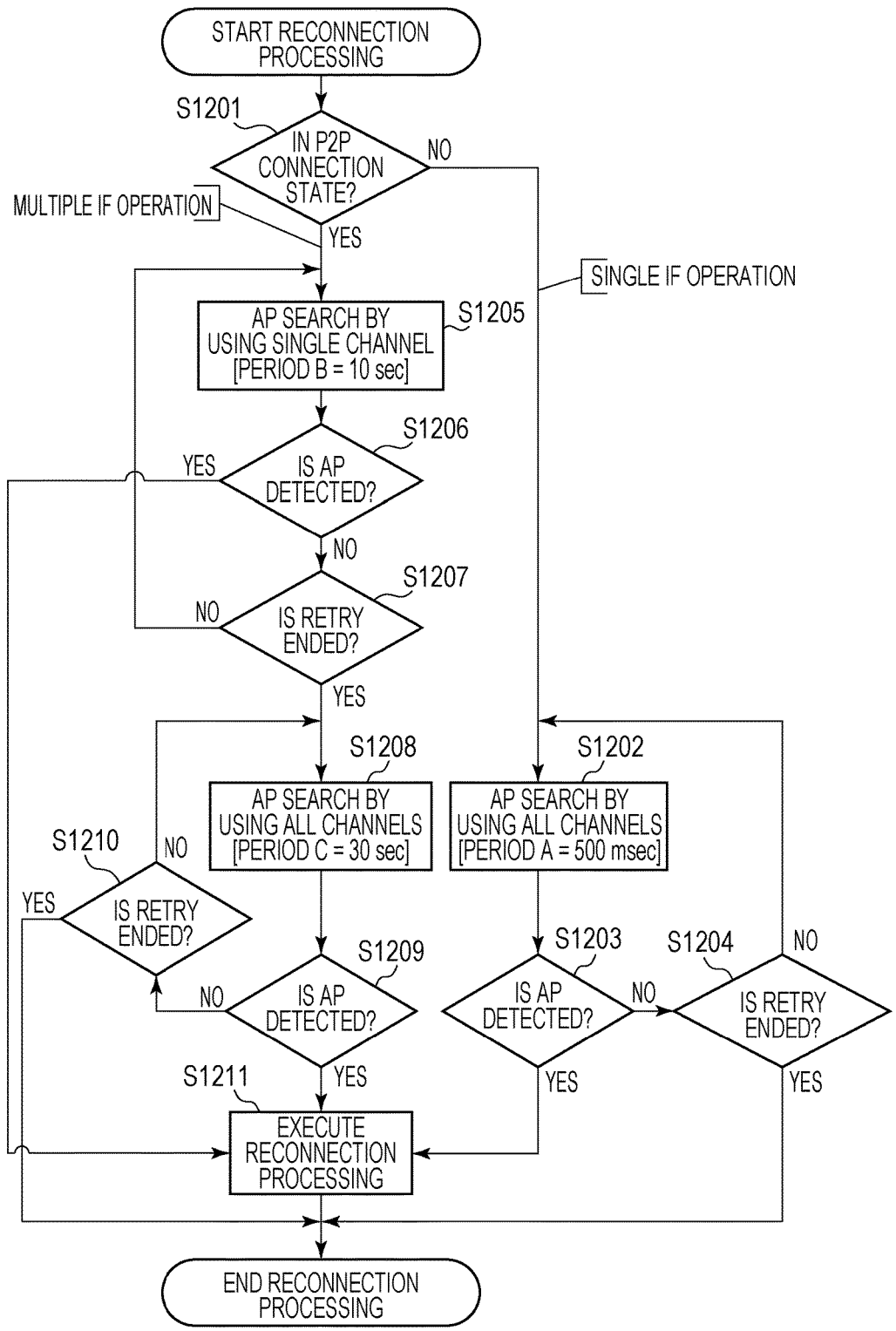
FIG. 12 is a flow chart illustrating reconnection processing executed by the MFP according to a first exemplary embodiment.

FIG. 12 is a flow chart illustrating the reconnection processing executed by the MFP 300 according to the present exemplary embodiment. It should be noted that the processing illustrated in the present flow chart is realized when the program stored in the memory such as the ROM 603 is read out by the CPU 602 to the RAM 604 to be executed, for example. In addition, the processing illustrated in the present flow chart is started in a case where the connection between the MFP 300 and the access point 400 is disconnected.

First, in S1201, the CPU 602 determines whether or not the connection between the MFP 300 and the access point 400 is disconnected in a state in which the MFP 300 performs the simultaneous operation. Specifically, the CPU 602 determines whether or not the MFP 300 is in a state of the P2P activation with the terminal apparatus 200. The state of the P2P activation refers to a state in which the interface utilized for the communication in the P2P mode is activated. More specifically, the CPU 602 determines whether or not the MFP 300 operates as the group owner (or the software AP). It should be noted that, according to the present exemplary embodiment, the MFP 300 can accept a setting on whether or not the negotiation is executed in the wireless connection sequence in the WFD mode from the user, and in a case where the setting indicating that the negotiation is executed is made, the simultaneous operation is not executed. For this reason, at this timing corresponding to a state in which the connection between the MFP 300 and the access point 400 is disconnected while the MFP 300 is in the simultaneous operation, the MFP 300 does not operate as the client in the P2P connection. That is, when the MFP 300 is in the state of the P2P activation, the MFP 300 operates as the group owner (or the software AP). Thus, when the CPU 602 determines whether or not the MFP 300 operates as the group owner (or the software AP), it is possible to determine whether or not the MFP 300 is in the state of the P2P activation. In a case where the MFP 300 does not operate as the group owner (or the software AP), the CPU 602 determines that the MFP 300 is not in the state of the P2P activation. On the other hand, in a case where the MFP 300 operates as the group owner (or the software AP), the CPU 602 determines that the MFP 300 is in the state of the P2P activation.

When the MFP 300 is not in the state of the P2P activation, only the interface for executing the communication in the infrastructure mode operates alone. That is, the connection between the MFP 300 and the access point 400 is disconnected in a state in which the MFP 300 does not execute the simultaneous operation. For this reason, in a case where the CPU 602 determines that the MFP 300 is not in the state of the P2P activation, the reconnection processing at the time of the utilization of the single interface in S1202 to S1204 and S1211 is executed.

On the other hand, when the MFP 300 is in the state of the P2P activation, the interface for executing the communication in the infrastructure mode and the interface for executing the communication in the P2P mode operate concurrently. That is, the connection between the MFP 300 and the access point 400 is disconnected in a state in which the MFP 300 executes the simultaneous operation. For this reason, in a case where the CPU 602 determines that the MFP 300 is in the state of the P2P activation, the reconnection processing at the time of the utilization of the multiple interfaces in S1205 to S1211 is executed.

It should be noted that the CPU 602 determines in S1201 whether or not the P2P connection is currently established, but the exemplary embodiment is not limited to this mode. For example, a determination may be made on whether or not the job is currently executed in a state of the operation in the P2P mode. In this case, the CPU 602 executes the reconnection processing at the time of the utilization of the multiple interfaces in a case where it is determined that the job is currently executed in the state of the operation in the P2P mode. On the other hand, the CPU 602 executes the reconnection processing at the time of the utilization of the single interface in a case where it is determined that the job is not currently executed in the state of the operation in the P2P mode.

The reconnection processing at the time of the utilization of the single interface will be described.

In S1202, the CPU 602 executes the AP search using all the channels (1 to 13). Specifically, the CPU 602 sequentially uses all the channels from Channel 1 to Channel 13 to continuously execute the AP search. It should be noted that it takes time of approximately 100 milliseconds to execute one AP search (AP search executed by using a certain single channel). For example, according to IEEE 802.11a standard, since the frequency band of 5 GHz is used, the CPU 602 uses Channels 36 to 140, but the numbers of the usable channels are not necessarily sequential numbers. In this case, the CPU 602 may execute the AP search by sequentially using the channels from a lower number. For example, first, after the channel currently used for the P2P connection is used to execute the AP search, the CPU 602 may execute the AP search by sequentially using the channels from Channel 1. In addition, in a case where the frequency band of 2.4 GHz (Channels 1 to 13) and the frequency band of 5 GHz (Channels 36 to 140) are used, the CPU 602 may start the AP search by using the channel corresponding to one of the frequency bands (for example, 5 GHz) by priority.

In S1203, the CPU 602 determines whether or not the access point 400 is detected by the AP search using all the channels. Specifically, the CPU 602 determines whether or not the device search response command is received from the access point 400. In a case where the device search response command is received from the access point 400, the CPU 602 determines that the access point 400 is detected and establishes the wireless connection with the access point 400 in S1211. On the other hand, in a case where the device search response command is not replied for a predetermined period of time or longer from the access point 400, the CPU 602 determines that the access point 400 is not detected and executes the processing in S1204.

In S1204, the CPU 602 determines whether or not the AP search using all the channels is ended. Specifically, the CPU 602 determines whether or not the number of retry attempts for the AP search using all the channels reaches an upper limit value L. In a case where the number of retry attempts for the AP search does not reach the upper limit value L, the CPU 602 determines that the AP search is not ended and returns to S1202 to execute the retry of the AP search. It should be noted that the CPU 602 waits for a predetermined time in accordance with a previously set period A before the retry of the AP search is executed. According to the present exemplary embodiment, since the period A is an "interval of 500 milliseconds", the CPU 602 waits for 500 milliseconds before the retry of the AP search is executed. It should be noted that the value of the period A is not limited to 500 milliseconds, and an arbitrary value may be set when a relationship with the period C which will be described below is satisfied. In addition, a mode may be adopted in which the value of the period A is increased each time the retry of the AP search in S1202 is executed. On the other hand, in a case where the number of retry attempts for the AP search reaches the upper limit value L, the CPU 602 determines that the AP search is ended, and the reconnection processing is ended. It should be noted that the CPU 602 may determine whether or not the AP search is ended by determining whether or not the number of retry attempts exceeds a threshold L instead of whether or not the number of retry attempts reaches the upper limit value L. It should be noted that the upper limit value of the number of retry attempts and the threshold L may be arbitrarily set by the user, or a mode may be adopted in which the upper limit value of the number of retry attempts and the threshold L are previously set at the time of arrival of shipment. In addition, for example, a configuration may be adopted in which the upper limit value of the number of retry attempts and the threshold L are set as infinite, and the AP search is repeated until the access point 400 is detected. In particular, at the time of the utilization of the single interface, even when the AP search using all the channels is repeated, the packet loss or the packet transmission delay does not occur. For this reason, the upper limit value of the number of retry attempts and the threshold L are set as infinite, and it is possible to improve the probability that the access point 400 can be detected without the occurrence of the packet loss or the packet transmission delay. In addition, the CPU 602 may execute the determination in S1204 by determining whether or not a predetermined time (time-out period) has elapsed after the AP search using all the channels is started. It should be noted that the value of the time-out period may also be arbitrarily set similarly as in the upper limit value L.

The reconnection processing at the time of the utilization of the multiple interfaces will be described.

In S1205, the CPU 602 executes the AP search by using the channel used for the disconnected connection between the MFP 300 and the access point 400. That is, the CPU 602 executes the AP search by using the single channel. It should be noted that the channel used for the connection between the MFP 300 and the access point 400 corresponds to the channel currently used for the P2P connection with the terminal apparatus 200. In addition, similarly as in the reconnection processing at the time of the utilization of the single interface, it takes time of approximately 100 milliseconds to execute one AP search.

In S1206, the CPU 602 determines whether or not the access point 400 is detected by the AP search using the single channel. Specifically, the CPU 602 determines whether or not the device search response command is received from the access point 400. In a case where the device search response command is received from the access point 400, the CPU 602 determines that the access point 400 is detected and executes the processing in S1211 to establish the wireless connection with the access point 400. On the other hand, in a case where the device search response command is not replied for a predetermined period of time or longer from the access point 400, the CPU 602 executes the processing in S1207.

In S1207, the CPU 602 determines whether or not the AP search using the single channel is ended. Specifically, the CPU 602 determines whether or not the number of retry attempts for the AP search using the single channel reaches an upper limit value M. In a case where the number of retry attempts for the AP search using the single channel does not reach the upper limit value M, the CPU 602 determines that the AP search using the single channel is not ended and returns to S1205 to execute the retry of the AP search. It should be noted that, according to the present exemplary embodiment, the upper limit value M of the number of retry attempts for the AP search using the single channel in the reconnection processing for the multiple interfaces is set as "4", but the value is not limited to this value, and an arbitrary value may be set. It should be noted that the CPU 602 may determine whether or not the AP search is ended by determining whether or not the number of retry attempts exceeds a threshold M instead of whether or not the number of retry attempts reaches the upper limit value M. It should be noted that the upper limit value of the number of retry attempts and the threshold M may be arbitrarily set by the user, or a mode may be adopted in which the upper limit value of the number of retry attempts and the threshold L are previously set at the time of arrival of shipment. In addition, the CPU 602 may execute the determination in S1207 by determining whether or not a predetermined time (time-out period) has elapsed after the AP search using the single channel is started. It should be noted that the value of the time-out period may also be arbitrarily set similarly as in the upper limit value M.

It should be noted that the CPU 602 waits for a predetermined time in accordance with a previously set period B before the retry of the AP search is executed. According to the present exemplary embodiment, since the period B is an "interval of 10 seconds", the CPU 602 waits for 10 seconds before the retry of the AP search is executed. It should be noted that the value of the period B is not limited to this mode, and an arbitrary value may be set if a relationship with a period C which will be described below is satisfied. In addition, a mode may be adopted in which the value of the period B is increased each time the retry of the AP search in S1205 is executed.

On the other hand, in a case where the number of retry attempts for the AP search using the single channel reaches the upper limit value M, the CPU 602 determines that the AP search using the single channel is ended, and the processing in S1208 is performed.

In S1208, the CPU 602 executes the AP search using all the channels (1 to 13). Specifically, the CPU 602 continuously executes the AP search by sequentially using all the channels from Channel 1 to Channel 13. It should be noted that, similarly as in the reconnection processing at the time of the utilization of the single interface, it takes time of approximately 100 milliseconds to execute one AP search. It should be noted that the CPU 602 does not necessarily need to execute the AP search using all the channels in S1208. The CPU 602 may execute the AP search by using at least the channel other than the channel used for the AP search using the single channel (channel used for the disconnected infrastructure connection). In addition, the order of the used channels is not particularly limited similarly as in the AP search in the reconnection processing at the time of the utilization of the single interface.

In S1209, the CPU 602 determines whether or not the access point 400 is detected by the AP search. Specifically, the CPU 602 determines whether or not the device search response command is received from the access point 400. In a case where the device search response command is received from the access point 400, the CPU 602 determines that the access point 400 is detected and executes the processing in S1211 to establish the wireless connection with the access point 400.

On the other hand, in a case where the device search response command is not replied for a predetermined period of time or longer from the access point 400, the CPU 602 executes the processing in S1210.

In S1210, the CPU 602 determines whether or not the AP search using all the channels is ended. Specifically, the CPU 602 determines whether or not the number of retry attempts for the AP search using all the channels reaches an upper limit value N. In a case where the number of retry attempts for the AP search does not reach the upper limit value N, the CPU 602 returns to S1208 and executes the retry of the AP search. It should be noted that the CPU 602 may determine whether or not the AP search is ended by determining whether or not the number of retry attempts exceeds a threshold N instead of whether or not the number of retry attempts reaches the upper limit value N. It should be noted that the upper limit value of the number of retry attempts and the threshold N may be arbitrarily set by the user, or a mode may be adopted in which the upper limit value of the number of retry attempts and the threshold L are previously set at the time of arrival of shipment. In addition, for example, a configuration may be adopted in which the upper limit value of the number of retry attempts and the threshold N are set as infinite, and the AP search is repeated until the access point 400 is detected. In addition, the CPU 602 may execute the determination in S1210 by determining whether or not a predetermined time (time-out period) has elapsed after the AP search using all the channels is started. It should be noted that the value of the time-out period may also be arbitrarily set similarly as in the upper limit value N.

It should be noted that the CPU 602 waits for a predetermined time in accordance with a period C before the retry of the AP search is executed. According to the present exemplary embodiment, since the period C is an "interval of 30 seconds", the CPU 602 waits for 30 seconds before the retry of the AP search is executed.

It should be noted that, according to the present exemplary embodiment, a value of the period C is set to be higher than the value of the period A. That is, a period in which the AP search in the reconnection processing at the time of the utilization of the multiple interfaces is executed is set to be longer than a period in which the AP search in the reconnection processing at the time of the utilization of the single interface is executed. The packet loss or the packet transmission delay in the communication in the P2P mode does not occur during the reconnection processing at the time of the utilization of the single interface. For this reason, while the period A is set to be short, the improvement in the probability of the reconnection between the access point 400 and the MFP 300 in the communication in the P2P mode is prioritized during the reconnection processing at the time of the utilization of the single interface. In addition, the probability that the packet loss or the packet transmission delay occurs is high during the reconnection processing at the time of the utilization of the multiple interfaces. For this reason, according to the present exemplary embodiment, while the period C is set to be long, the suppression of the occurrence of the packet loss or the packet transmission delay in the communication in the P2P mode during the reconnection processing at the time of the utilization of the multiple interfaces is prioritized.

In addition, according to the present exemplary embodiment, the value of the period C is set to be higher than the value of the period B. That is, the period in which the AP search using the channel other than the channel used for the P2P connection with the terminal apparatus 200 is executed is set to be longer than the period in which the AP search using the channel used for the P2P connection with the terminal apparatus 200 is executed. The probability that the packet loss occurs in the communication with the terminal apparatus 200 is low during the AP search using the channel used for the P2P connection with the terminal apparatus 200. For this reason, according to the present exemplary embodiment, while the period B is set to be short, the improvement in the probability of the reconnection between the access point 400 and the MFP 300 is prioritized during the AP search using the channel used for the P2P connection with the terminal apparatus 200. On the other hand, the probability that the packet loss or the packet transmission delay occurs in the communication with the terminal apparatus 200 is high during the AP search using the channel other than the channel used for the P2P connection with the terminal apparatus 200. For this reason, according to the present exemplary embodiment, while the period C is set to be long, the suppression of the occurrence of these issues is prioritized during the AP search using the channel other than the channel used for the P2P connection with the terminal apparatus 200.

It should be noted that the period C is set as the "interval of 30 seconds" as described above, but the exemplary embodiment is not limited to this mode. An arbitrary value may be set if the relationship with the period A described above and a relationship with the period B are satisfied. In addition, a mode may be adopted in which the value of the period C is increased each time the retry of the AP search in S1210 is executed. In this case, a mode may also be adopted in which a retry time interval may be exponentially increased.

As described above, according to the present exemplary embodiment, the MFP 300 controls the cycles of the respective AP searches to improve the probability of the reconnection with the access point 400, and also the occurrence of the packet loss or the packet transmission delay in the communication in the P2P mode can be suppressed.

Second Exemplary Embodiment

According to the present exemplary embodiment, a mode will be described in which a connection state of the MFP 300 is checked each time the retry of the AP search is specified.

It should be noted that the communication system, the configurations of the respective apparatuses, and the like according to the present exemplary embodiment are similar to those according to the first exemplary embodiment.

Figure 13:
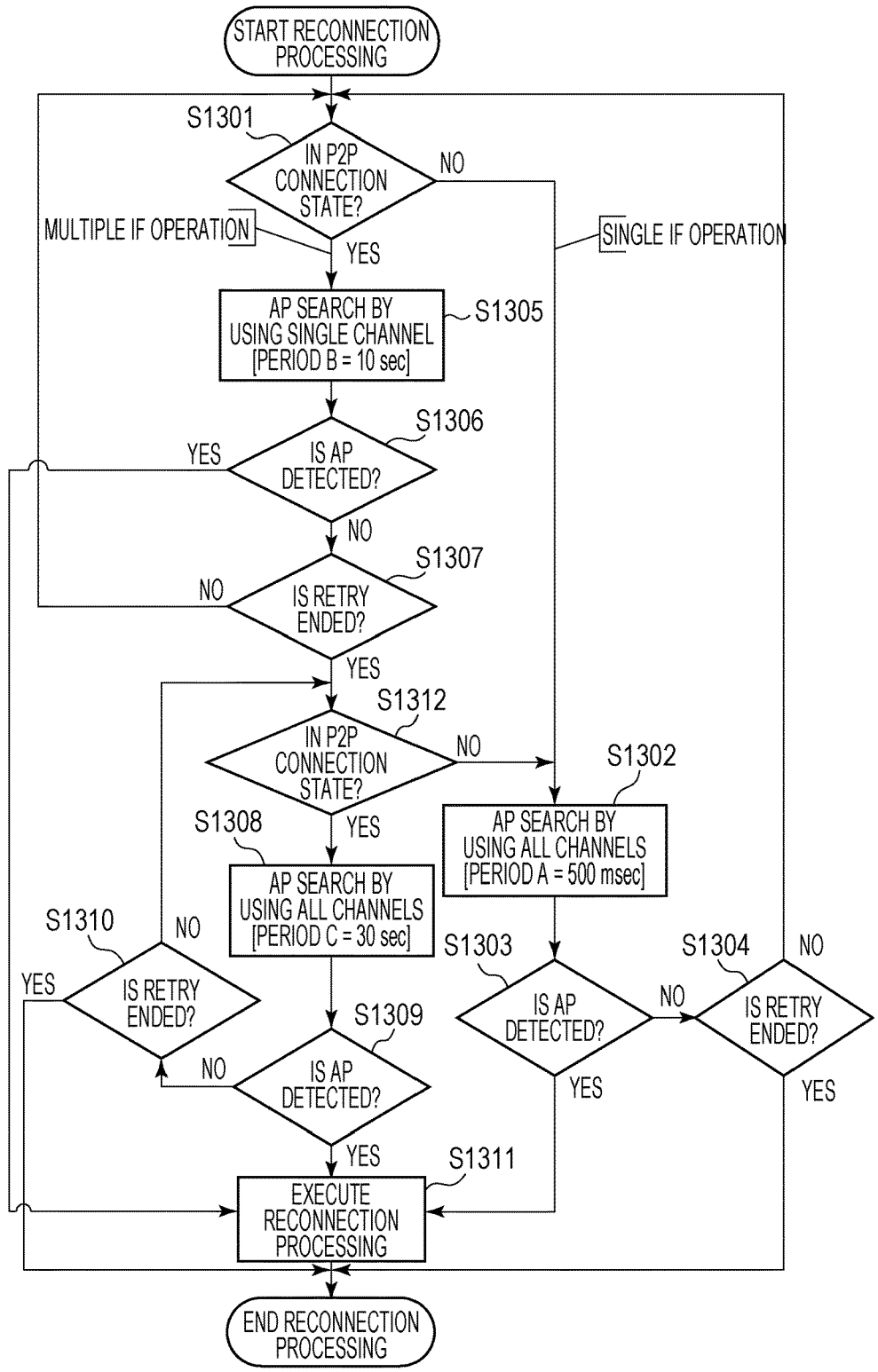
FIG. 13 is a flow chart illustrating the reconnection processing executed by the MFP according to a second exemplary embodiment.

FIG. 13 is a flow chart illustrating the reconnection processing executed by the MFP 300 according to the present exemplary embodiment. It should be noted that the processing illustrated in the present flow chart is realized when the program stored in the memory such as the ROM 603 is read out by the CPU 602 to the RAM 604 to be executed, for example. In addition, the processing illustrated in the present flow chart is started in a case where the connection between the MFP 300 and the access point 400 is disconnected in a state in which the MFP 300 is connected to the terminal apparatus 200 and the access point 400 concurrently.

First, in S1301, the CPU 602 determines whether or not the MFP 300 is in the P2P connection state. Since the processing in S1301 is similar to the processing in S1201, the detailed descriptions thereof will be omitted. In a case where it is determined that the MFP 300 is not in the P2P connection state, the CPU 602 performs the processing in S1302 to execute the reconnection processing at the time of the utilization of the single interface. On the other hand, in a case where it is determined that the MFP 300 is in the P2P connection state, the CPU 602 performs the processing in S1304 to execute the reconnection processing at the time of the utilization of the multiple interfaces.

The reconnection processing at the time of the utilization of the single interface will be described.

In S1302, the CPU 602 executes the AP search using all the channels (1 to 13). Since the processing in S1302 is similar to the processing in S1202, the detailed descriptions thereof will be omitted.

In S1303, the CPU 602 determines whether or not the access point 400 is detected by the AP search using all the channels. Since the processing in S1303 is similar to the processing in S1203, the detailed descriptions thereof will be omitted. In a case where it is determined that the access point 400 is detected, the CPU 602 executes the processing in S1308 to establish the wireless connection with the access point 400. On the other hand, in a case where it is determined that the access point 400 is not detected, the CPU 602 executes the processing in S1304.

In S1304, the CPU 602 determines whether or not the AP search using all the channels is ended. Since the processing in S1304 is similar to the processing in S1204, the detailed descriptions thereof will be omitted. In a case where it is determined that the AP search is not ended, the CPU 602 executes the processing in S1301 again. That is, the CPU 602 checks the connection state of the MFP 300 again before the retry of the AP search is performed. It should be noted that the CPU 602 waits for a predetermined time in accordance with the previously set period A before the processing in S1301 is executed again. According to the present exemplary embodiment, similarly as in the first exemplary embodiment, since the period A is the "interval of 500 milliseconds", the CPU 602 waits for 500 milliseconds before the processing in S1301 is executed again. It should be noted that the timing when the CPU 602 waits is not limited to the timing before the processing in S1301 is executed again and may be, for example, a timing before the processing in S1302 is executed again. On the other hand, in a case where it is determined that the AP search is ended, the CPU 602 ends the processing.

The reconnection processing at the time of the utilization of the multiple interfaces will be described.

In S1305, the CPU 602 executes the AP search by using the channel used for the disconnected connection between the MFP 300 and the access point 400. That is, the CPU 602 executes the AP search by using the single channel. Since the processing in S1305 is similar to the processing in S1205, the detailed descriptions thereof will be omitted.

In S1306, the CPU 602 determines whether or not the access point 400 is detected by the AP search using the single channel. Since the processing in S1306 is similar to the processing in S1206, the detailed descriptions thereof will be omitted. In a case where it is determined that the access point 400 is detected, the CPU 602 executes the processing in S1311 to establish the wireless connection with the access point 400. On the other hand, in a case where it is determined that the access point 400 is not detected, the CPU 602 executes the processing in S1307.

In S1307, the CPU 602 determines whether or not the AP search using the single channel is ended. Since the processing in S1307 is similar to the processing in S1207, the detailed descriptions thereof will be omitted. In a case where it is determined that the AP search using the single channel is not ended, the CPU 602 executes the processing in S1301 again. That is, the CPU 602 checks the connection state of the MFP 300 again before the retry of the AP search is performed. It should be noted that the CPU 602 waits for a predetermined time in accordance with the previously set period B before the processing in S1301 is executed again. According to the present exemplary embodiment, similarly as in the first exemplary embodiment, since the period B is the "interval of 10 seconds", the CPU 602 waits for 10 seconds before the processing in S1301 is executed again. It should be noted that the timing when the CPU 602 waits is not limited to the timing before the processing in S1301 is executed again and may be, for example, a timing before the processing in S1305 is executed again. On the other hand, in a case where it is determined that the AP search using the single channel is ended, in S1312, the CPU 602 determines whether or not the MFP 300 is in the P2P connection. Since the processing in S1305 is similar to the processing in S1301, the detailed descriptions thereof will be omitted. In a case where it is determined that the MFP 300 is not in the P2P connection, the CPU 602 performs the processing in S1302 to execute the reconnection processing at the time of the utilization of the single interface. On the other hand, in a case where it is determined that the MFP 300 in the P2P connection state, the CPU 602 executes the AP search using all the channels (1 to 13) in S1308.

Since the processing in S1308 and S1309 is similar to the processing in S1208 and S1209, the detailed descriptions thereof will be omitted.

In S1310, the CPU 602 determines whether or not the AP search using all the channels is ended. Since the processing in S1310 is similar to the processing in S1210, the detailed descriptions thereof will be omitted. In a case where it is determined that the AP search using all the channels is not ended, the CPU 602 executes the processing in S1312 again. That is, the CPU 602 checks the connection state of the MFP 300 again before the retry of the AP search is performed. It should be noted that the CPU 602 waits for a predetermined time in accordance with the previously set period C before the processing in S1312 is executed again. According to the present exemplary embodiment, similarly as in the first exemplary embodiment, since the period C is the "interval of 30 seconds", the CPU 602 waits for 30 seconds before the processing in S1312 is executed again. It should be noted that the timing when the CPU 602 waits is not limited to the timing before the processing in S1312 is executed again and may be, for example, a timing before the processing in S1308 is executed again. On the other hand, in a case where it is determined that the AP search using all the channels is ended, the CPU 602 ends the processing.

In addition, in a case where the reconnection with the access point 400 is executed in S1311, the CPU 602 ends the processing.

As described above, according to the present exemplary embodiment, before the retry of the AP search is performed, the MFP 300 checks the connection state of the MFP 300 (whether or not the MFP 300 is in the P2P connection state) and executes the AP search in accordance with the connection state of the MFP 300. As a result, for example, even in a case where the connection state of the MFP 300 is changed during the reconnection processing too, the MFP 300 can execute the appropriate AP search in accordance with the connection state after the change.

Third Exemplary Embodiment

According to the present exemplary embodiment, a mode will be described in which the AP search using all the channels is divided and executed.

It should be noted that the communication system, the configurations of the respective apparatuses, and the like according to the present exemplary embodiment are similar to those according to the above-described exemplary embodiments.

Figure 14:
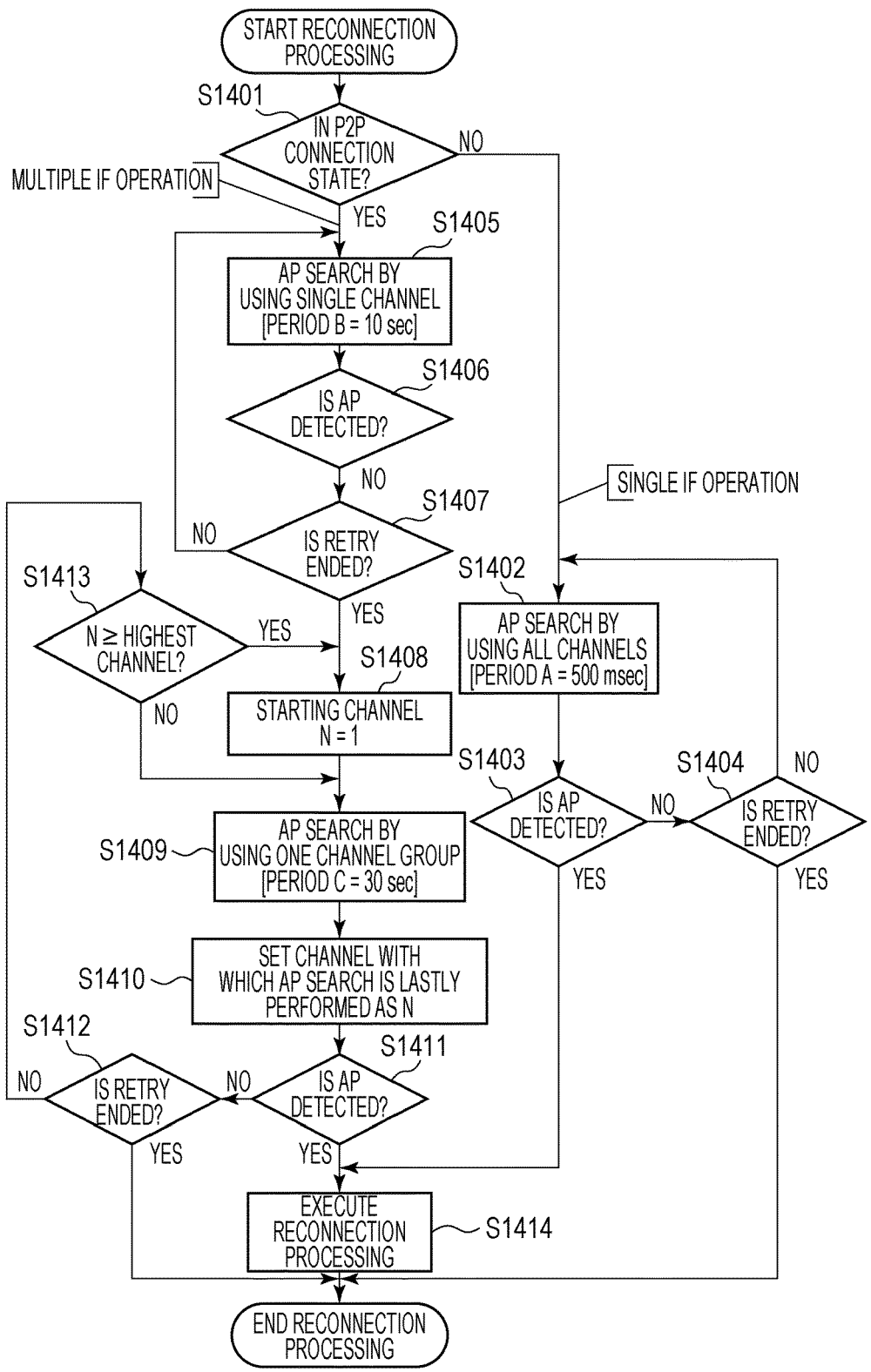
FIG. 14 is a flow chart illustrating the reconnection processing executed by the MFP according to a third exemplary embodiment.

FIG. 14 is a flow chart illustrating the reconnection processing executed by the MFP 300 according to the present exemplary embodiment. It should be noted that the processing illustrated in the present flow chart is realized when the program stored in the memory such as the ROM 603 is read out by the CPU 602 to the RAM 604 to be executed, for example. In addition, the processing illustrated in the present flow chart is started in a case where the connection between the MFP 300 and the access point 400 is disconnected in a state in which the MFP 300 is connected to the terminal apparatus 200 and the access point 400 concurrently.

Since the processing in S1401 to S1407 is similar to the processing in S1201 to S1207, the detailed descriptions thereof will be omitted. It should be noted that the period A and the period B of the AP search are similar to those according to the first exemplary embodiment.

The AP search using all the channels in the reconnection processing at the time of the utilization of the multiple interfaces will be described. According to the present exemplary embodiment, the CPU 602 divides all the channels used for the AP search into a plurality of channel groups and waits each time the AP search using one channel group is ended. According to the present exemplary embodiment, a value of a channel number T used for one AP search is previously set. Herein, the value of the channel number T is set as 3, and all the channels (1 to 13) are divided into Channel Group 1 (1 to 3), Channel Group 2 (4 to 6), Channel Group 3 (7 to 9), and Channel Group 4 (10 to 13). It should be noted that the value of the channel number T is not limited to 3. An arbitrary value may be used, or the value may also be appropriately changed by a user operation or the like. It should be noted that a configuration may be adopted in which, in a case where all the channels are not divisible by the value of the channel number T, a channel group including only the remaining channel may be provided, or the remaining channel may be included in the last channel group.

In S1408, the CPU 602 specifies execution of the AP search by sequentially using the channels from Channel 1.

In S1409, the CPU 602 executes the AP search using one channel group. For example, after the processing in S1408 is executed, the CPU 602 specifies use of Channel Group 1 (1 to 3) and executes the AP search by sequentially using the channels from Channel 1 to Channel 3. It should be noted that, according to the present exemplary embodiment, in a case where the processing in S1409 is repeated, the channel groups are used in an ascending order. For example, in a case where Channel Group 1 (1 to 3) is used in the previous time, the CPU 602 executes the AP search by using Channel Group 2 (4 to 6).

In S1410, the CPU 602 specifies the channel having the highest number among the channels used in the previous AP search (S1409) and sets the specified channel number as a setting value U.

In S1411, the CPU 602 determines whether or not the access point 400 is detected by the AP search. In a case where it is determined that the access point 400 is detected, the CPU 602 executes the processing in S1414 to establish the wireless connection with the access point 400. On the other hand, in a case where it is determined that the access point 400 is not detected, the CPU 602 executes the processing in S1412.

In S1412, the CPU 602 determines whether or not the AP search is ended. Specifically, the CPU 602 determines whether or not the number of retry attempts for the AP search reaches the upper limit value L. In a case where the number of retry attempts for the AP search does not reach the upper limit value L, the CPU 602 determines that the AP search is not ended and executes the processing in S1413. It should be noted that, according to the present exemplary embodiment, the processing in S1409 is repeated, and each time the AP search using all the channel groups is executed, the number of retry attempts is incremented. It should be noted that the CPU 602 waits for a predetermined time in accordance with a previously set period C before the processing in S1413 is executed. According to the present exemplary embodiment, similarly as in the first exemplary embodiment, since the period C is the "interval of 30 seconds", the CPU 602 waits for 30 seconds before the processing in S1413 is executed. It should be noted that the timing when the CPU 602 waits is not limited to the timing before the processing in S1413 is executed again and may be, for example, a timing before the processing in S1408 or S1409 is executed again. On the other hand, in a case where the number of retry attempts for the AP search reaches the upper limit value L, the CPU 602 determines that the AP search is ended, and the reconnection processing is ended.

In S1413, the CPU 602 determines whether or not the setting value U reaches a value of the highest number among the numbers of all of the usable channels (13 in a case where all the channels are Channels 1 to 13). That is, the CPU 602 determines whether or not the AP search is executed by using all the channel groups while the processing in S1409 is repeated. In a case where the setting value U reaches the value of the highest number, the CPU 602 determines that the AP search is executed by using all the channel groups and performs the processing in S1408. That is, the CPU 602 specifies execution of the AP search by sequentially using the channels from Channel 1 again. On the other hand, in a case where the setting value U does not reach the value of the highest number, the CPU 602 determines that the AP search is not executed by using all the channel groups and performs the processing in S1409. That is, the CPU 602 specifies execution of the AP search by using a channel group that has not yet been used (channel group different from the channel group used in the previous time).

In this manner, according to the present exemplary embodiment, the CPU 602 does not use all the channels in one AP search but uses part of channels (channel group) among all the channels. In other words, the CPU 602 executes the AP search using all the channels while waiting is inserted by once or plural times. As a result, it is possible to shorten the time to execute one AP search, and temporally continuous occurrence of the packet loss or the packet transmission delay can be suppressed.

It should be noted that the mode in which the AP search is executed by using the channel groups in the ascending order has been described above, but the order of the used channel groups is not particularly limited. For example, a mode may be adopted in which the channel group including the channel used for the connection between the MFP 300 and the access point 400 is used at the beginning.

Other Exemplary Embodiments

According to the above-described exemplary embodiments, the MFP 300 uses Wi-Fi to execute the communication in the P2P mode or the communication in the infrastructure mode, but the exemplary embodiments are not limited to this mode. For example, other communication methods such as Bluetooth (registered trademark) may be used.

In addition, according to the above-described exemplary embodiments, the mode has been described in which the period B is longer than the period A, but the exemplary embodiment is not limited to this mode. A mode in which the period A and the period B are the same or a mode in which the period A is longer than the period B may also be adopted. However, for example, a mode is proposed in which the reconnection processing at the time of the utilization of the single interface and the reconnection processing at the time of the utilization of the multiple interfaces are executed by different systems or CPUs. According to the above-described mode, processing load of the reconnection processing at the time of the utilization of the multiple interfaces may be higher than processing load of the reconnection processing at the time of the utilization of the single interface in some cases, and the processing load can be abbreviated when the period B is set to be longer than the period A. In addition, during the execution of the AP search using the channel used for the communication in the P2P mode, the packet loss does not occur in the communication in the P2P mode, but the packet transmission delay may occur. In the mode in which the above-described issue occurs, when the period B is set to be longer than the period A, it is possible to suppress the occurrence of the packet transmission delay.

In addition, according to the above-described exemplary embodiments, the mode has been described in which the occurrence of the packet loss or the packet transmission delay in the communication in the P2P mode by controlling the cycles of the respective AP searches, but the exemplary embodiments are not limited to this mode. For example, a mode may be adopted in which the occurrence of the packet loss or the packet transmission delay in the communication in the P2P mode is suppressed while the number of retry attempts for the respective AP searches or retry time is controlled instead of the cycles of the respective AP searches. In this case, as described above, the relationships related to the upper values of the numbers of retry attempts for the respective AP searches include L>N and M>N. In addition, in the case of a mode in which time for repeating the respective AP searches (retry time) is set, a relationship of the retry times that the retry time of the AP search in S1202>the retry time of the AP search in S1208 is established. In addition, a relationship that the retry time of the AP search in S1205>the retry time of the AP search in S1208 is established. It should be noted that a mode of a relationship including the cycles of the respective AP searches, the number of retry attempts, and the retry times in combination may be adopted.

The above-described exemplary embodiments are also realized when the following processing is executed. That is, software (program for realizing the functions of the above-described exemplary embodiments is supplied to a system or an apparatus via a network or various storage media, and a computer (a CPU, an MPU, or the like) of the system or the apparatus reads out the program to be executed. The program may be executed by a single computer or a plurality of computers in conjunction with each other. All the processings described above do not necessarily need to be realized by the software, and part or all of the processings may be realized by hardware such as an ASIC. In addition, the entire processing may be performed by a single CPU or may also be appropriately performed by a plurality of CPUs in cooperation with each other.

According to the exemplary embodiments of the present invention, it is possible to improve the usability for the user in the technology for searching for the external apparatus in a case where the connection with the external apparatus is disconnected in the state of the simultaneous operation.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-101791 filed May 20, 2016, which is hereby incorporated by reference herein in its entirety.

What is claimed is:

1. A control method for a communication apparatus capable of establishing a first wireless connection based on a predetermined communication standard with a first apparatus and a second wireless connection based on the predetermined communication standard with a second apparatus, wherein the communication apparatus is able to establish the first wireless connection and the second wireless connection concurrently in a case where a communication channel used for the first wireless connection is the same as a communication channel used for the second wireless connection, the control method comprising:
   executing first search processing at a first interval more than once in a case where the second wireless connection is disconnected in a state in which the first wireless connection and the second wireless connection are established concurrently, wherein the first search processing is a search for the second apparatus by using a plurality of communication channels, and executing second search processing at a second interval shorter than the first interval more than once in a case where the second wireless connection is disconnected in a state in which the first wireless connection and the second wireless connection are not established concurrently, wherein the second search processing is a search for the second apparatus by using a plurality of communication channels; and
   establishing the second wireless connection in a case where the second apparatus capable of being wirelessly connected to the communication apparatus is discovered by one of the first search processing and the second search processing.

2. The control method according to claim 1, wherein the search processing for searching for the second apparatus is processing for transmitting a predetermined packet that requests a response with respect to the second apparatus.

3. The control method according to claim 1, wherein the communication channel used for the second wireless connection is determined by the second apparatus.

4. The control method according to claim 1, wherein the predetermined communication standard is Wi-Fi.

5. The control method according to claim 1, further comprising:
   communicating with the first apparatus without an intermediation of an apparatus other than the first apparatus by way of the first wireless connection; and
   communicating with a third apparatus that is connected to the second apparatus via the second apparatus by way of the second wireless connection.

6. The control method according to claim 1, further comprising:
   printing an image on a recording medium.

7. The control method according to claim 1,
wherein third search processing is executed at a third interval shorter than the first interval more than once in a case where the second wireless connection is disconnected in a state in which the first wireless connection and the second wireless connection are established concurrently, wherein the third search processing includes a search for the second apparatus by using the communication channel used for the first wireless connection, and
wherein the second wireless connection is established in a case where the second apparatus capable of being wireless connected to the communication apparatus is discovered by executing the third search processing.

8. The control method according to claim 7,
wherein the first search processing executed in a case where the second apparatus capable of being wirelessly connected to the communication apparatus is not discovered by executing the third search processing.

9. The control method according to claim 7,
wherein the second interval is shorter than the third interval.

10. The control method according to claim 1,
wherein the first search processing is a search for the second apparatus by using at least a communication channel other than the communication channel used for the first wireless connection.

11. The control method according to claim 1,
wherein each of the first search processing and the second search processing is a search for the second apparatus by using all communication channels corresponding to a frequency band of 2.4 GHz.

12. The control method according to claim 1,
wherein each of the first search processing and the second search processing includes first processing of transmitting, to the second apparatus via a first communication channel, a predetermined packet for requesting for a response, and second processing of transmitting the predetermined packet via a second communication channel after the first processing.

13. The control method according to claim 1, further comprising:
   determining whether or not the second wireless connection is disconnected in a state in which the communication apparatus is operating as an apparatus that plays a role of an access point;
   wherein the first search processing is executed at the first interval more than once on a basis of determination that the second wireless connection is disconnected in a state in which the communication apparatus is operating as the apparatus that plays the role of the access point, and the second search processing is executed at the second interval more than once on a basis of determination that the second wireless connection is disconnected in a state in which the communication apparatus is not operating as the apparatus that plays the role of the access point.

14. The control method according to claim 1,
wherein the first wireless connection is a connection based on a predetermined communication standard between the communication apparatus that is operating as the apparatus that plays the role of the access point and the first apparatus, and
wherein the first wireless connection is a connection based on the predetermined communication standard between the second apparatus that is operating as the apparatus that plays the role of the access point and the communication apparatus.

15. A communication apparatus capable of establishing a first wireless connection based on a predetermined communication standard with a first apparatus and a second wireless connection based on the predetermined communication standard with a second apparatus, wherein the communication apparatus is able to establish the first wireless connection and the second wireless connection concurrently in a case where a communication channel used for the first wireless connection is the same as a communication channel used for the second wireless connection, the communication apparatus comprising:

a search unit configured to execute first search processing at a first interval more than once in a case where the second wireless connection is disconnected in a state in which the first wireless connection and the second wireless connection are established concurrently, wherein the first search processing is a search for the second apparatus by using a plurality of communication channels, and execute second search processing at a second interval shorter than the first interval more than once in a case where the second wireless connection is disconnected in a state in which the first wireless connection and the second wireless connection are not established concurrently, wherein the second search processing is a search for the second apparatus by using a plurality of communication channels; and a connection unit configured to establish the second wireless connection in a case where the second apparatus capable of being wirelessly connected to the communication apparatus is discovered by one of the first search processing and the second search processing.

* * * * *